(12) United States Patent
Andrea

(10) Patent No.: US 8,786,261 B2
(45) Date of Patent: Jul. 22, 2014

(54) CELL MODULES FOR DETECTING TEMPERATURE AND VOLTAGE OF CELLS

(76) Inventor: Davide Andrea, Boulder, CO (US)

( * ) Notice: Subject to any disclaimer, the term of this patent is extended or adjusted under 35 U.S.C. 154(b) by 770 days.

(21) Appl. No.: 13/084,751

(22) Filed: Apr. 12, 2011

(65) Prior Publication Data

US 2012/0223582 A1    Sep. 6, 2012

Related U.S. Application Data

(60) Provisional application No. 61/449,018, filed on Mar. 3, 2011.

(51) Int. Cl.
*H02J 7/00* (2006.01)
*H02J 13/00* (2006.01)

(52) U.S. Cl.
CPC ............ *H02J 7/0016* (2013.01); *H02J 7/0045* (2013.01); *H02J 13/0003* (2013.01)
USPC .............. 320/152; 429/90; 429/121; 429/123

(58) Field of Classification Search
USPC .............. 320/116, 118, 119, 152; 429/90, 99, 429/121, 123
See application file for complete search history.

(56) References Cited

U.S. PATENT DOCUMENTS

| | | | | |
|---|---|---|---|---|
| 6,677,759 | B2 * | 1/2004 | Friel et al. | 324/430 |
| 7,508,171 | B2 * | 3/2009 | Carrier et al. | 320/138 |
| 7,602,146 | B2 * | 10/2009 | Carrier et al. | 320/120 |
| 7,772,799 | B2 * | 8/2010 | Wu | 320/104 |
| 7,812,566 | B2 * | 10/2010 | Chen | 320/110 |
| 8,237,407 | B2 * | 8/2012 | Hurst et al. | 320/128 |
| 8,614,016 | B2 * | 12/2013 | Yusa et al. | 429/99 |

* cited by examiner

*Primary Examiner* — Edward H Tso
*Assistant Examiner* — Ramy Ramadan
(74) *Attorney, Agent, or Firm* — William W. Cochran; Cochran Freund & Young LLC

(57) ABSTRACT

Disclosed is a distributed battery management system that uses cell modules that are attached to cell terminals. A connector tab extends from the cell modules that provides a solid thermal and electrical connection to a cell terminal, as well as structural support for the cell module. A single wire is used to connect the cell modules that carries power, a voltage sample level, a serial data stream, indicating the temperature at a cell terminal to which the cell module is connected, and voltage level of each of the cells, as well as discharge current to equalize the charge of each of the cells. Various adapters can be used for different cell formats, which provide structural support for the cell modules. Reverse connection protection circuitry is also provided that protects the circuitry in the cell modules from accidental reverse connection.

29 Claims, 18 Drawing Sheets

# CELL MODULES FOR DETECTING TEMPERATURE AND VOLTAGE OF CELLS

CROSS-REFERENCE TO RELATED APPLICATION

The present patent application is based upon and claims the benefit of U.S. Provisional Patent Application Ser. No. 61/449,018, filed on Mar. 3, 2011, by Davide Andrea, entitled "Cell Modules for Detecting Temperature and Voltage of Cells," which is hereby specifically incorporated herein by reference for all that it discloses and teaches.

BACKGROUND

Batteries have been very useful in providing a source of portable power. Batteries contain a plurality of cells that are connected in various configurations, including parallel configurations, series configurations and combinations of both parallel and series combinations. Cells come in various formats and can be connected in various ways to provide a battery configuration. In addition, cells may use a wide variety of different chemistries for creating an electrical output. Each of the different chemistries has advantages and disadvantages when incorporated in cells that form a battery.

SUMMARY OF THE INVENTION

An embodiment of the present invention may therefore comprise a distributed battery management system having a plurality of cells comprising: a cell module comprising: a connector tab that is adapted to be connected to a first terminal of a first cell of the plurality of cells so that a solid connection is created between the connector tab and the first terminal that provides electrical and thermal conductivity between the first terminal and the connector tab and structural support for the connector tab, and provides a first voltage signal from the first terminal of the first cell, provides a first voltage level sample of the first voltage signal from the first terminal, and provides a temperature level of the first terminal; electrical components connected to the connector tab that detect the temperature level of the first terminal of the first cell and generate a temperature data signal indicative of the temperature level of the first terminal, and that detect a first voltage level on the first terminal from the first voltage level sample; a module housing that is structurally supported by the connector tab that surrounds and protects the electrical components; a first wire connected to a previous cell module of the distributed battery management system and the electric components that provides a second voltage level signal to the electrical components from a second terminal of the first cell that, together with the first voltage signal, provides power to the electrical components, and that provides a second voltage level sample of a second voltage from the second terminal of the first cell so that the electrical components can generate a voltage level signal indicative of a voltage level of the first cell, the first wire further connected to conduct a discharge current between the first terminal and the second terminal of the first cell, and transmit data representative of a voltage level and temperature of the previous cell; a second wire connected to the electrical components that transmits the first voltage signal and the first voltage sample signal from the first terminal of the first cell, and the temperature data signal and the voltage level signal to a subsequent cell module.

An embodiment of the present invention may further comprise a method of maintaining cells in a battery using a distributed battery management system comprising: connecting a connector tab of a first cell module to a first terminal of a first cell so that a solid connection is made between the connector tab and the first terminal that provides electrical and thermal conductivity between the first terminal and the connector tab, as well as structural support for the connector tab; connecting electrical components of the first cell module to the connector tab so that the electrical components detect a temperature level of the first terminal and generate a temperature data signal, and obtain a first voltage signal from the first terminal of the first cell; connecting the electrical components to a second terminal of the first cell using a first wire that is connected to a previous cell module, that provides a second voltage signal to the electrical components that, together with the first voltage signal, provides power to the electrical components; comparing the first voltage signal and the second voltage signal in the electrical components to produce a voltage level signal indicative of a voltage level of the first cell; transmitting the voltage level signal, the temperature data signal and the second voltage signal through a second wire that is connected to the first cell module to a subsequent cell module, together with additional voltage level signals and additional temperature data signals from the previous cell module and any additional previous cell modules; receiving control signals through the first wire that cause the electrical components to create a discharge current between the second terminal and the first terminal through the first wire and the connector tab to balance said battery, the control signals generated in response to the temperature data signal and the voltage level signal of the first cell.

DETAILED DESCRIPTION OF THE EMBODIMENTS

Figure 1:
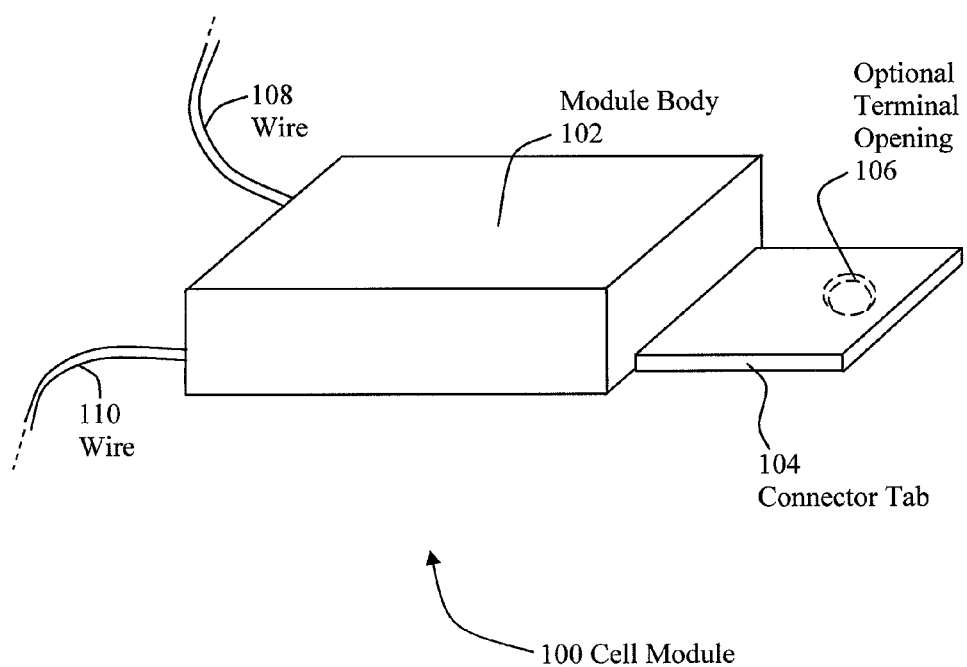
FIG. 1 is a schematic perspective view of an embodiment of a cell module.

FIG. 1 is a schematic illustration of an embodiment of a cell module 100. The cell module 100 includes a module body 102 that contains and protects electronic components. These electronic components may be mounted on a printed circuit board that is surrounded by the module body 102. The module body 102 can be made from a plastic, metal, or other materials that are capable of protecting these electronic components. A hard plastic material can provide a high degree of protection and can provide an insulating encasement. The use of a hard plastic material for module body 102 provides greater protection than conformal coatings or epoxy coverings. The hard plastic provides protection against shock and direct impacts to the printed circuit board and electronic components on the cell modules. A connector tab 104 is connected to the printed circuit board in the module body 102 and projects from one side of the module body 102. The module body 102 holds the connector tab 104 is a secure manner to the module body 102 to provide structural support between the module body 102 and connector tab 104. In this manner, the cell module 100 is a secure structure consisting of the module body 102 and the connector tab 104, as well as the electrical components that are stored in, and protected by, the module body 102. Connector tab 104 is adapted to connect to a battery terminal. The connection to the battery terminal can be with a bolt or screw that extends through an optional terminal opening 106. Alternatively, the connector tab 104 can be spot welded, soldered or otherwise connected directly to the battery terminal. Other ways of connecting the connector tab 104 can also be used, as long as a solid and stable connection is made that provides structural support to module body 102, and a solid electrical and thermal connection is made between the connector tab 104 and the battery terminal. Various types of cell formats for lithium ion batteries are disclosed in FIGS. 6-9, which also disclose the manner in which the connector tab 104 can be connected to these various types of formats using adapters and connections of the connector tab 104 directly to the cell terminal.

As also illustrated in FIG. 1, wires 108, 110 extend from the module body 102 and are connected to the electronic components in the module body 102. These wires are also secured by the module body 102, so that a secure and solid connection is created between the wires and the module body 102. Wires 108, 110 extend to adjacent cell module 100 and, using a single wire, carry power to operate the electronic components, voltage levels of the cells, data relating to the operation of the cells in the battery, and a discharge current to balance the cells in the battery, as explained in more detail below.

The cell module 100 may be employed on lithium ion cells, or other types of cells. Lithium ion cells have good performance characteristics within a relatively small, safe operating range. Operation outside of the safe operating range may damage the batteries or, even worse, cause a safety concern. A battery management system that reduces or prevents charging and discharging of lithium ion cells outside of a safe operating range extends the operating life of the lithium ion cells, and reduces or eliminates safety concerns. The various embodiments disclosed herein operate with lithium ion cells, since the voltage of lithium ion cells is sufficiently high to power the electronics in each of the cell modules. The electronics of the cell modules would normally not be able to operate with individual cells of other chemistries, because the voltage levels of cells with almost all other chemistries is too low. However, the various embodiments disclosed herein may be used with two or more cells of other chemistries that are placed in series, such as two NiMH cells, which, when placed in series, would produce three volts nominal voltage, which would be sufficient to run the cell electronics. In that regard, the various embodiments disclosed herein can be used and applied to various types of cells with various types of chemistries with two or more cells connected in series.

In a typical non-distributed battery monitoring system, the voltage of individual cells is measured at end points of the battery, as well as midpoints between cells in series. In such systems, wires are routed from each voltage sensing point, which is typically the cell terminal, to an electronic assembly that measures the voltages of each of the cells. Routing of these wires from the battery presents logistical problems. The sensing wires may facilitate a high current arc discharge, which can create substantial safety concerns. In large batteries, that are wired in series, a high voltage can be produced, which requires special handling of the sensing wires to prevent safety hazards. In addition, the sensing wires act as antennas that are affected by electrical noise, which reduces the quality of measurements made by the battery management system.

In typical distributed battery management systems, each set of cell electronics requires two connections to each cell, i.e., a wire that is connected to each cell terminal, to measure the voltage of that cell. In addition, a set of signal wires must be used to connect the cell electronics to a main controller. Data regarding the status of each cell is provided on one or more balanced pairs of serial digital communication lines, or through dedicated lines, to report that a cell voltage is too low or too high, as well as wires that carry balance currents, to remove voltage from the most charged cells, to enable charging of the remaining cells, and redundant lines for additional safety. In a typical battery with 100 cells, there may be as many as 1800 wires and as many as 3600 connections. While the wire itself is not expensive, the installation of these wires can be expensive, since many of the connections are made by hand. In addition, because of the numerous connections, the process is prone to failure. As such, the reliability of the overall system is at risk. In that regard, an incorrect connection to a cell terminal during assembly can likely destroy the electronics, as a result of reverse powering. Reducing the number of interconnections of each set of cell electronics, by having fewer wires that share more functions, in accordance with embodiments disclosed herein, reduces the likelihood of improper or bad connections.

Some distributed battery management systems use pre-wired modules to avoid some of the problems associated with incorrectly connecting wires between the modules and to a main controller. Since the distance between the cell modules may not be known, the wires are longer than necessary, so that different cell form factors can be accommodated. Alternatively, connectors may be provided on the wires that match other connectors, to ensure that improper connections are not made. Again, this results in wires with additional length that function as antennas and creates routing problems between the cell modules.

Further, battery management systems typically use cell boards that are open printed circuit board assemblies, with no protection for the electronic components, other than, possibly, a conformal coating or an epoxy covering. For production battery systems, and for batteries used in harsh environments, open printed circuit board assemblies can become easily damaged. Also, some printed circuit boards are directly mounted on the cell terminals, or have ring connectors that match the size of a threaded hole or stud, such as on prismatic and large cylindrical cells. Various problems exist with such devices, as a result of stresses created when tightening a terminal bolt or nut. Further, thermal swings can cause a nut or bolt to loosen and become unreliable as a result of different thermal expansion properties of the printed circuit board material and the metal hardware of the terminals and connectors of the cells. As a result, different versions of the cell board are necessary to accommodate the various form factors and sizes for the different cells. For cells that do not include a stud, or threaded terminals, the cell board is typically soldered directly to metal tabs that are welded to the cell terminal, such as in small cylindrical cells, or fastened to the tabs of pouch cells. Both of these solutions suffer from the need for different versions of the cell board to accommodate various cell form factors and sizes.

The embodiments of distributive battery management systems, such as disclosed herein, include electronics for each cell that can be mounted on the cell itself or between the cells, with signal connections between adjacent sets of cell electronics. Negative end cell modules and positive end cell modules can use isolated communications between the battery and a master controller. The use of fiber optics or wireless communications isolates the battery from the master controller and prevents high current DC arc discharges. In this manner, high voltage signal wires, that would otherwise be connected to a master controller, are eliminated, which eliminates or reduces safety concerns. Further, electrical noise is reduced because fewer wires are used and the wires have substantially shorter lengths. Further, cell modules that are coupled to, or connected directly to, a cell terminal can measure temperature at a cell terminal and provide thermal data, together with the cell voltage data, in a serial stream, to a main controller, as disclosed in more detail below.

Figure 2:
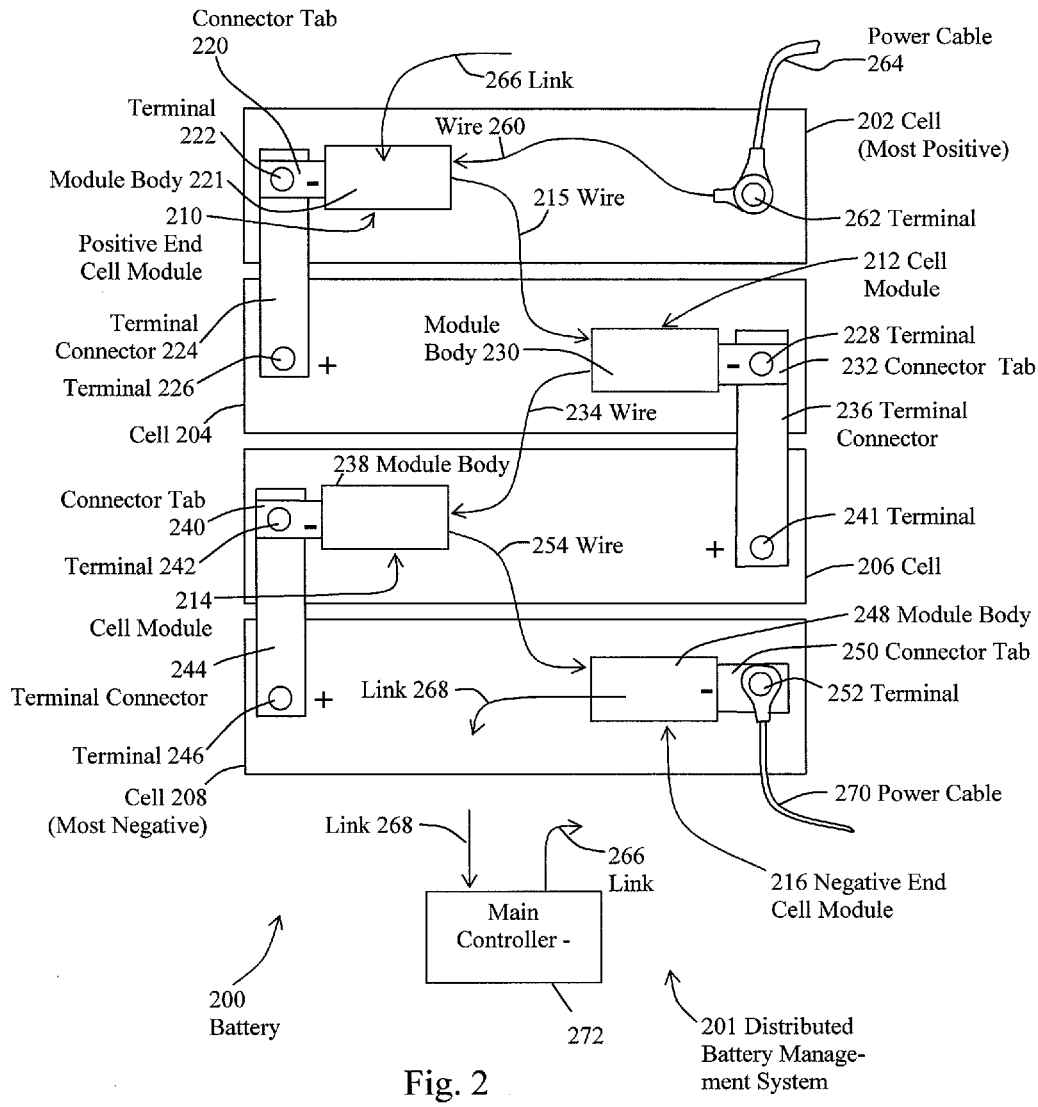
FIG. 2 is a schematic diagram of an embodiment of a layout of a battery using cell modules.

FIG. 2 is a schematic top view of a battery 200 that discloses an embodiment of a distributed battery management system 201. Terminal connector 224 connects the positive terminal 226 of cell 204 to negative terminal 222 of cell 202. Terminal connector 236 connects the positive terminal 241 of cell 206 to negative terminal 228 of cell 204. Terminal connector 244 connects the positive terminal 246 of cell 208 to negative terminal 242 of cell 206. In this fashion, each of the cells 202-208 are connected in series, so that the voltage differential between power cable 270, which is connected to terminal 252 of the most negative cell 208, and power cable 264 that is connected to terminal 262 of the most positive cell 202, provides sufficient voltage and current to power the electronic device to which the power cables 264, 270 are connected. For example, cells 202-208 may comprise lithium ion cells that are used to drive electric motors in an electric car.

As also shown in FIG. 2, the battery 200, positive end cell module 210 has a connector tab 220, extending from module body 221, that is connected to the negative terminal 222 of the most positive cell 202. Cell module 212 has a connector tab 232, extending from module body 230, that is connected to the negative terminal 228 of cell 204. Cell module 214 has a connector tab 240, extending from module body 238, that is connected to the negative terminal 242 of cell 206. Negative end cell module 216 has a connector tab 250, extending from module body 248, that is connected to the negative terminal 252 of the most negative cell 208. Module bodies 221, 230, 238, 248 contain electrical components that monitor and control the cells 202, 204, 206, 208, respectively.

One of the purposes of the cell modules 210-216 of the distributed battery management system, illustrated in the embodiment of FIG. 2, is to manage the cells 202-208, including charging and discharging the cells 202-208, so that the cells 202-208 are maintained within the proper operating parameters of the cells 202-208. For example, positive end cell module 210 is capable of detecting the voltage of cell 202, since the connector tab 220 is connected to terminal 222, which provides the voltage at terminal 222 to positive end cell module 210. Similarly, wire 260 is connected to terminal 262, which provides the positive end cell module 210 the voltage on terminal 262. The difference between the voltage levels at terminal 222 and terminal 262 is equal to the voltage of cell 202. By using a connector tab 220, which may be spot welded to the terminal connector 224, or connected directly to the terminal 222, the use of a wire is eliminated. In addition, the connector tab 220 has a sufficient amount of metal to provide high thermal conductivity to module body 221, so that the temperature of terminal 222 can be detected by the positive end cell module 210. As disclosed above, the connector tab 220 also provides a solid support for the module body 221, in which the electrical components of the positive end cell module 210 are mounted. In production batteries, a solid connection of the cell module to the cell prevents problems associated with disconnection or damage to the distributed battery management system 201. Depending upon the form factor of the cells, permanent or semi-permanent types of connections can be made between the terminals and the connector tabs, such as between terminal 222 and connector tab 220, such as spot welding, soldering, use of thread locking material or other techniques suitable for production batteries to provide structural support and a solid electrical and thermal connection.

Hence, positive end cell module 210 detects both the temperature at terminal 222 and the voltage of cell 202, and generates data in the form of a digital data stream that is transmitted along wire 215 to cell module 212, from cell module 212 on wire 234 to cell module 214, on wire 254 to negative end cell module 216, and on link 268 to the main controller 272. Similarly, digital data from cell module 212 relating to the voltage of cell 204 and temperature data relating to the temperature on terminal 228 is appended to the digital data stream and transmitted, through the wires 234, 254 and link 268 to main controller 272, in the manner described above. Further, data generated by cell module 214 relating to the voltage of cell 206 and the temperature of terminal 242, as well as data from negative end cell module 216, relating to the voltage of cell 208 and the temperature at terminal 252, is appended to the digital data stream and transmitted to the main controller 272. In this way, the wires 215, 234, 254 and link 268 can be used to transmit the digital data from the cell modules 210, 212, 214, 216 to the main controller 272 using a single wire between each set of adjacent cell modules, which also provides the additional functions described above.

The cell modules 210, 212, 214, 216 measure the voltage, in the manner described above. The main controller 272 can use the voltage measurements as one of the inputs to a complex algorithm to estimate the state of charge (SOC) of each of the cells. The distributed battery management system 201 can then use this information to manage battery 200.

As further shown in FIG. 2, main controller 272 has a link 266 that transmits control data in a data stream to positive end cell module 210, as well as cell module 212, cell module 214 and negative end cell module 216, to control the operation of cell modules 210-216. One of the functions that is performed by the cell modules 210-216 is the equalization of charges of each of the cells 202-208, so that charging of the battery 200 will not result in overcharging of any individual cell. This process is accomplished by lowering the charge of the higher charged cells by creating a small drain current between the positive and negative terminals of the cells for the overly charged cell over time, until the voltage on each of the cells 202-208 is substantially equal. This process is explained in more detail with respect to the description of FIGS. 4 and 5.

As also illustrated in FIG. 2, cell module 212 is connected to cell module 210 by wire 215. The voltage at terminal 222 is transmitted through positive end cell module 210, over wire 215 to cell module 212, which measures the difference between the voltage at terminal 222 and terminal 228 to determine the voltage of cell 204. The voltage on terminal 222 is the same as the voltage on terminal 226, since terminal 222 and terminal 226 are connected via terminal connector 224. Connector tab 232 of cell module 212 is connected to terminal 228, which measures the voltage on terminal 228, as well as the temperature of cell 204 at terminal 228. Hence, both the voltage of cell 204, as well as the temperature at terminal 228, are detected by cell module 212 using the electrical components in the module body 230 in the manner described below with respect to the description of FIGS. 4 and 5. These data are also transmitted via wire 234, wire 254 and link 268 to the main controller 272, as described above by appending the data to a data stream.

As further illustrated in FIG. 2, wire 234 provides the voltage level at terminal 228, through cell module 2121, to cell module 214. Connector tab 240 provides the voltage level of cell 206 at terminal 242. Since terminal 228 is connected to terminal 241 of cell 206, by way of terminal connector 236, the voltage on terminal 228 is the same as the voltage on terminal 241. The difference between the voltage level on terminal 242 and the voltage level on terminals 228/241 is the voltage of cell 206, which is measured by cell module 214. Cell module 214 also detects the temperature at terminal 242 by way of connector tab 240.

The negative end cell module 216 measures the voltage of the most negative cell 208, as well as the temperature at terminal 252. Through cell module 238, wire 254 provides the voltage level at terminal 242 to negative end cell module 216. Connector tab 250 is connected to terminal 252 and detects the voltage level of cell 208 at terminal 252. Since terminal 242 is electrically connected to terminal 246 of cell 208, by way of terminal connector 244, the voltage level at terminal 242 is the same as the voltage level at terminal 246. In this manner, the negative end cell module 216 detects the voltage level at terminal 246, and the voltage level of terminal 252, to determine the voltage of cell 208. Connector tab 250 also provides the temperature of cell 208 at terminal 252 to the electrical components that are disposed within the module body 248 of the negative end cell module 216. The temperature and voltage data is appended to the data stream and is transmitted on link 268 to main controller 272. Again, main controller 272 has a link 266 that links control signals that control the negative end cell module 216, as well as the other cell modules 210, 212, 214 via wires 215, 234, 254.

In this manner, wires 215, 234, 254 provide voltage level samples to cell modules 212, 214, 216, respectively, as well as functioning as data links to transmit data to main controller 272. In addition, wires 260, 215, 234 and 254 function to provide drain currents to equalize the voltage of each of the cells 202-208, as described in more detail below with respect to FIGS. 4 and 5. Further, the voltages provided by wires 260, 215, 234 and 254 provide power to operate the cell modules 210-216. Link 266, 268 may comprise a wireless link, fiber optic link, or other type of link that provides isolation between the positive end cell module 210 and the main controller 272, as well as isolation between the negative end cell module 216 and the main controller 272. Any suitable type of isolation link can be used so that the voltages that exist on the cell modules are not transmitted to the main controller 272, including, but not by way of limitation, wireless links and fiber optic links. Additionally, opto-isolators that are connected to wires can be used to provide isolation. Opto-isolators can be disposed in the modules and connected to wires that are connected to the main controller 272. Alternatively, the opto-isolators can also be disposed in main controller 272 and connected to wires that are connected to the modules to provide isolation of the main controller 272 from links 266, 268. Further, the cell modules have been shown connected in a particular configuration. Other configurations can certainly be utilized. For example, the cell modules can be connected to the positive terminals instead of the negative terminals, in which case the positive end cell module will have two wires and the negative end cell module will have three wires, instead of two. In addition, the flow of data has been shown from the most positive cell to the most negative cell. Data can flow in either direction for various configurations.

Figure 3A:
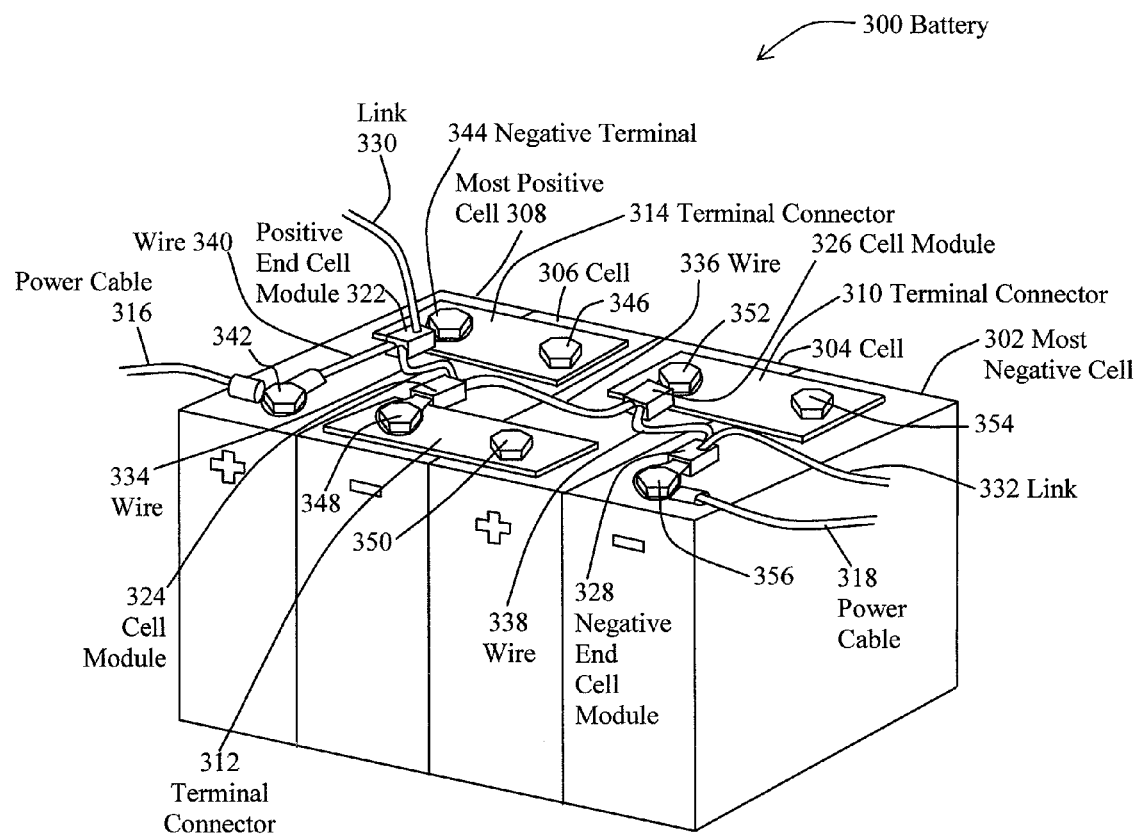
FIG. 3A is a schematic perspective view of an embodiment of a battery showing the use of cell modules.

FIG. 3A is a schematic perspective view of a battery 300 that is connected to a distributed battery management system. As shown in FIG. 3A, battery 300 comprises most positive cell 308, cell 306, cell 304 and most negative cell 302. Each of the cells 302-308 are connected in series. Terminal 342 of the most positive cell 308 is connected to power cable 316. Negative terminal 356 of the most negative cell 302 is connected to the power cable 318. The series connection between the cells 302-308 is made by terminal connector 310, which connects positive terminal 354 to negative terminal 352, terminal connector 312, which connects positive terminal 350 to negative terminal 348, and terminal connector 314 that connects positive terminal 346 to negative terminal 344. Positive end cell module 322 is connected to negative terminal 344 of most positive cell 308. Cell module 324 has a connector tab that is connected to negative terminal 348 of cell 306. Cell module 326 has a connector tab that is connected to negative terminal 352 of cell 304. Negative end cell module 328 has a connector tab that is connected to negative terminal 356 of most negative cell 302. Link 332 and link 330 are connected to a main controller, such as main controller 272 of FIG. 2, which controls the various functions described above, such as equalization of the charge of each of the cells 302-308 using drain currents that flow through wires 340, 334, 336, 338. Wires 334, 336, 338 also transmit voltage levels to the cell modules 324, 326, 328, respectively, that are used to sample the voltage levels of the cells 302-306, as well as provide power to operate cell modules 324, 326, 328 and communicate data regarding temperature and voltage levels to a main controller, such as main controller 272, illustrated in FIG. 2.

Figure 3B:
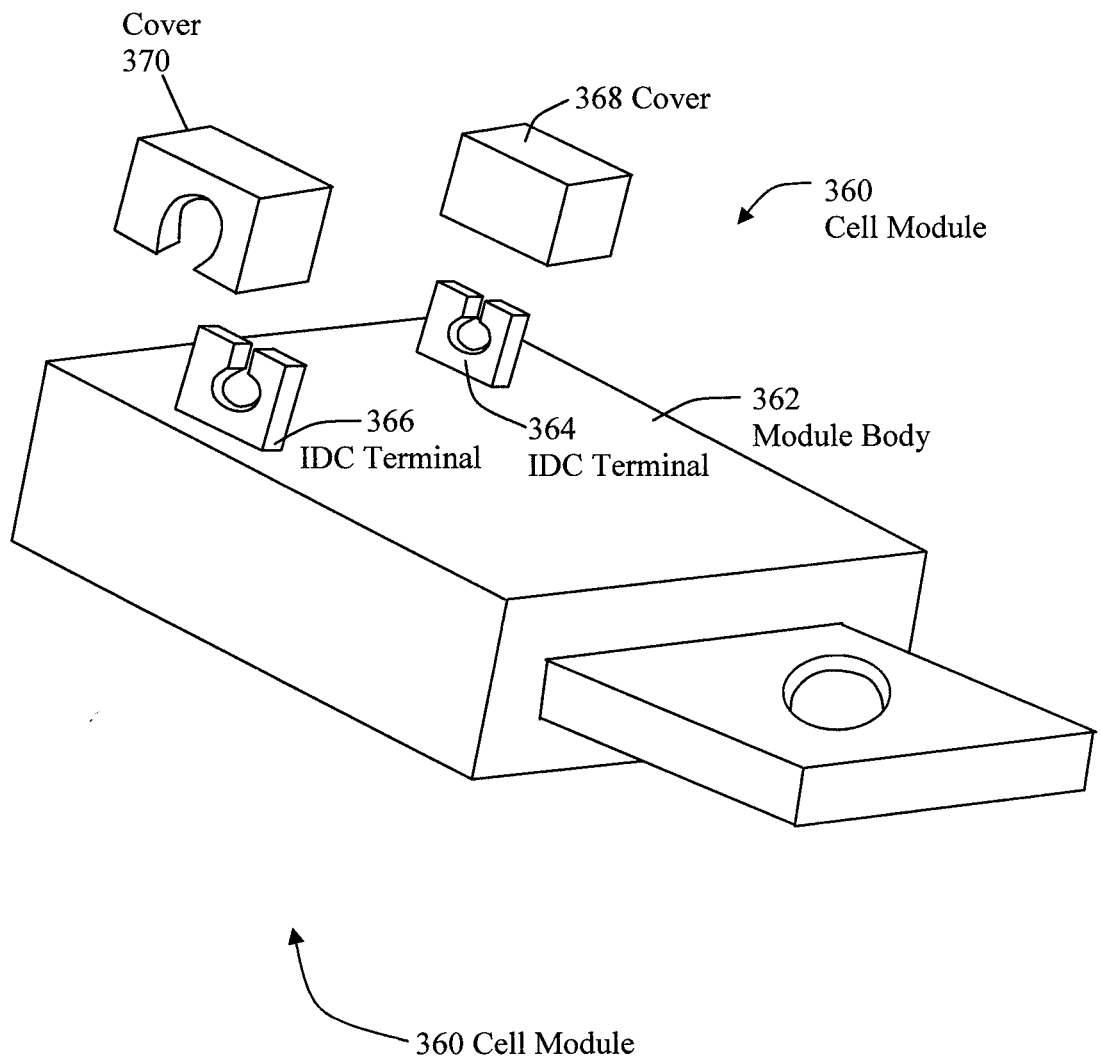
FIG. 3B is a schematic perspective view of a cell module using insulation displacement connectors.

FIG. 3B is a schematic perspective view of an embodiment of a cell module 360. As shown in FIG. 3B, insulation displacement terminals 364, 366 are provided on the module body 362. In this manner, the proper length of wire between cell modules, such as cell module 360, can be provided, so that additional wire, which can cause routing problems near the cells and extra wire that acts as an antenna, are not present, since the wires can be cut to length and connected to cell module 360 using the insulation displacement terminals 364, 366. Covers 368, 370 cover the insulation displacement terminals 364, 366 to prevent inadvertent contact with wires and cell terminals that could damage cell module 360.

Figure 3C:
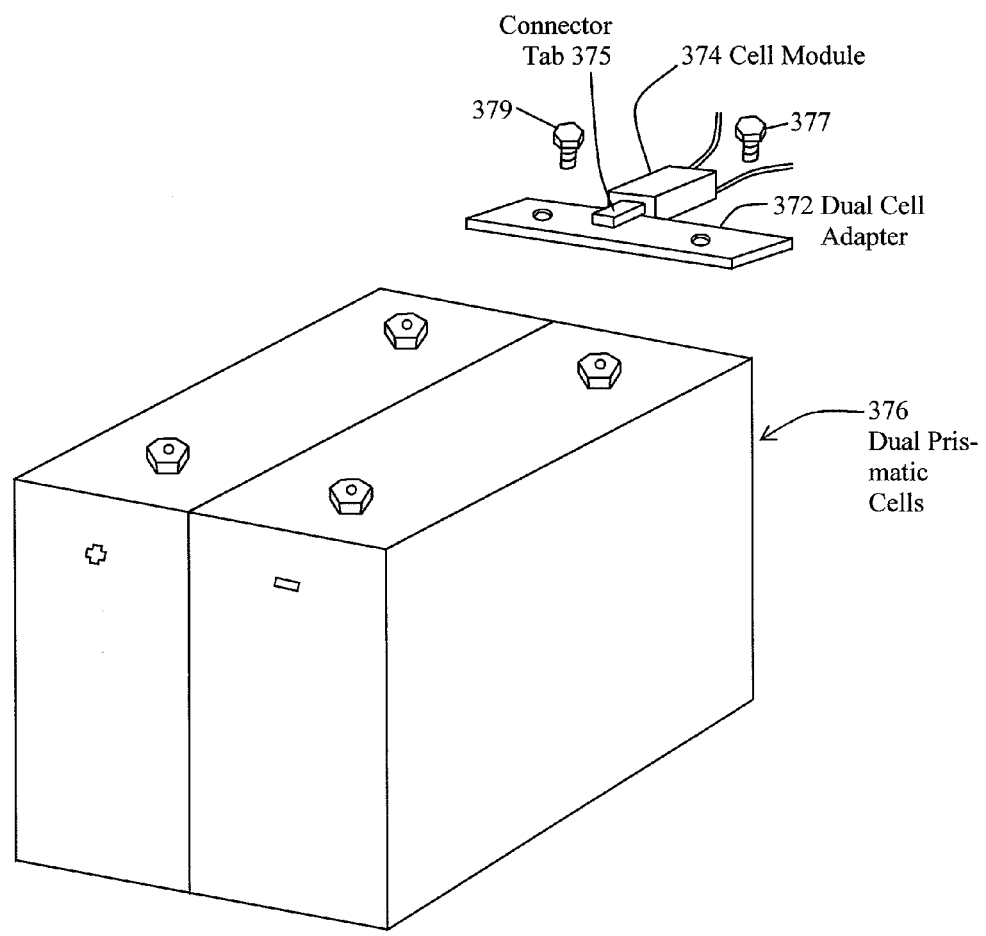
FIG. 3C is a schematic perspective view of an embodiment of a dual cell adapter for dual prismatic cells.

FIG. 3C illustrates a dual cell adapter 372 that can be used with dual prismatic cells 376. As shown in FIG. 3C, cell module 374 has a connector tab 375 that is connected to the dual cell adapter 372 by spot welding, soldering or other permanent connection that provides structural support of cell module 374 and a solid electrical and thermally conductive connection between connector tab 375 and dual cell adapter 372. Dual cell adapter 372 is adapted to connect to the terminals of the dual prismatic cells 376 using bolts 377, 379.

Figure 3D:
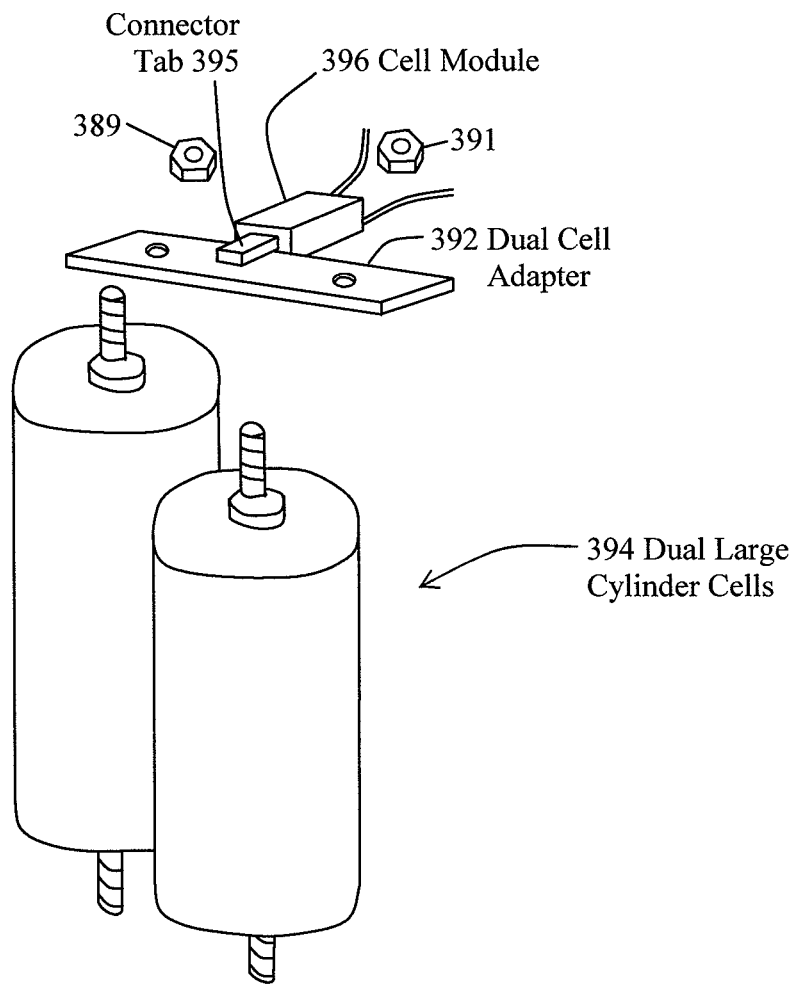
FIG. 3D is a schematic perspective view of an embodiment of a dual cell adapter for dual large cylindrical cells.

FIG. 3D is a schematic illustration of an embodiment of a dual cell adapter 392 for dual large cylindrical cells 394. Cell module 396 has a connector tab 395 that is connected to the dual cell adapter 392. Connector tab 395 can be welded, soldered, or connected in any fashion that provides a strong structural support for the cell module 396 and a solid electrical and thermal connection between the connector tab 395 and the dual cell adapter 392. The dual cell adapter 392 is then connected to the threaded posts of the dual large cylindrical cells 394 using nuts 389, 391.

Figure 3E:
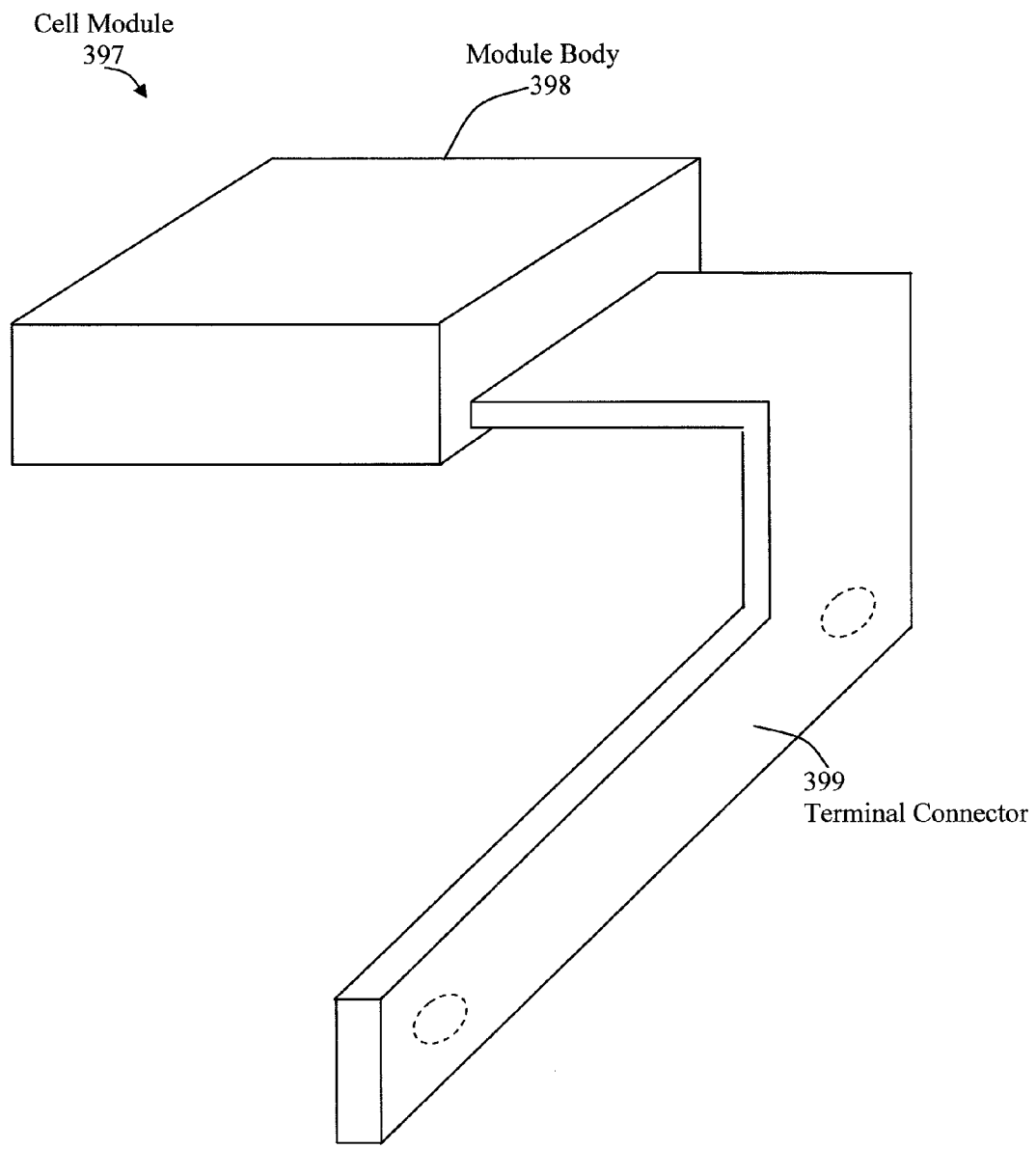
FIG. 3E is a schematic perspective view of an embodiment of an integral tab and terminal connector.

FIG. 3E is a schematic perspective view of an embodiment of a terminal connector 399 that functions as an integral connector tab and terminal connector. The terminal connector 399 forms a tab that protrudes from the module body 398 of cell module 397 and extends a length to connect to terminals of adjacent cells. In other words, the terminal connector 399 functions as both a connector tab for the module body 398, as well as a terminal connector 399 as an integral unit, for connection to cell terminals of adjacent cells.

Figure 3F:
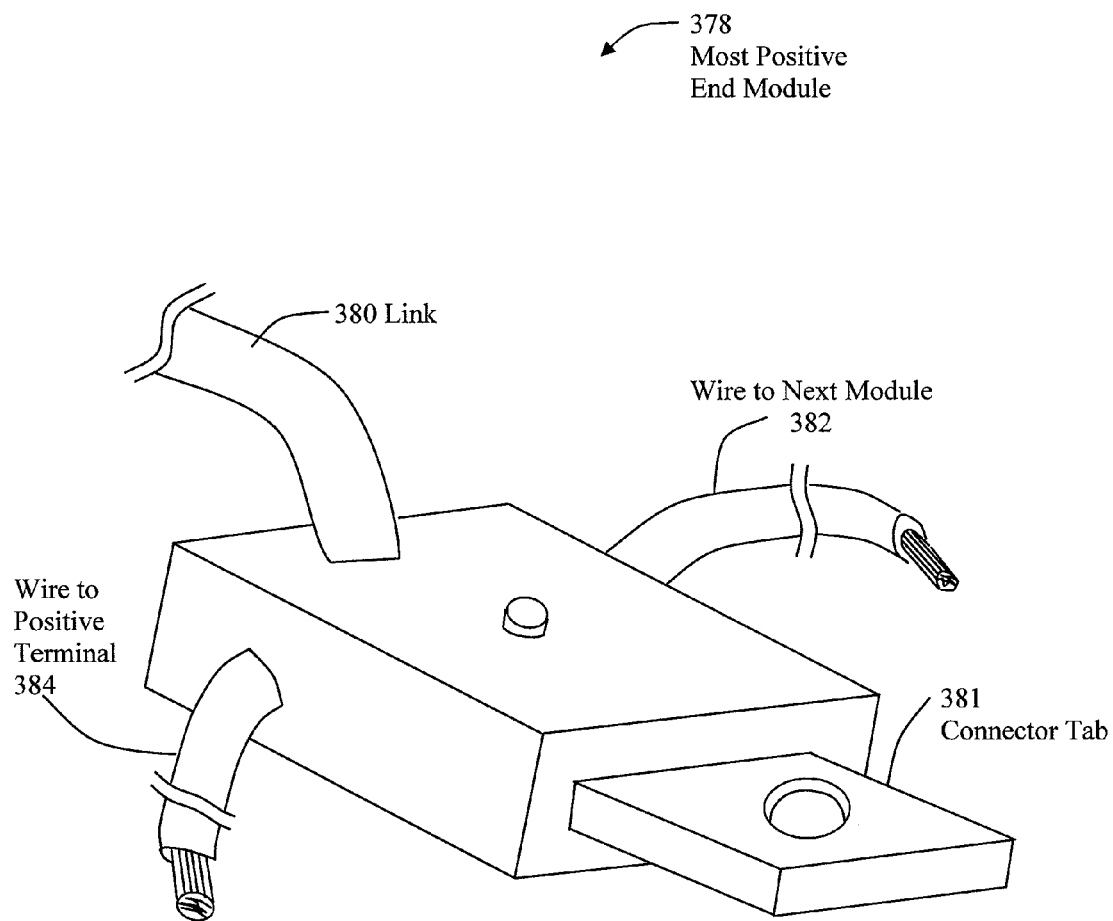
FIG. 3F is a schematic perspective view of a most positive end module.

FIG. 3F is a schematic perspective view of an embodiment of a most positive end module 378. The most positive end module 378 has a wire 382 that connects to the next most positive module. Connector tab 381 is connected to the negative terminal of the most positive cell. Wire 384 is connected to the positive terminal of the most positive cell. Link 380 provides an isolated link for receiving control signals from a main controller, such as main controller 272, illustrated in FIG. 2.

Figure 3G:
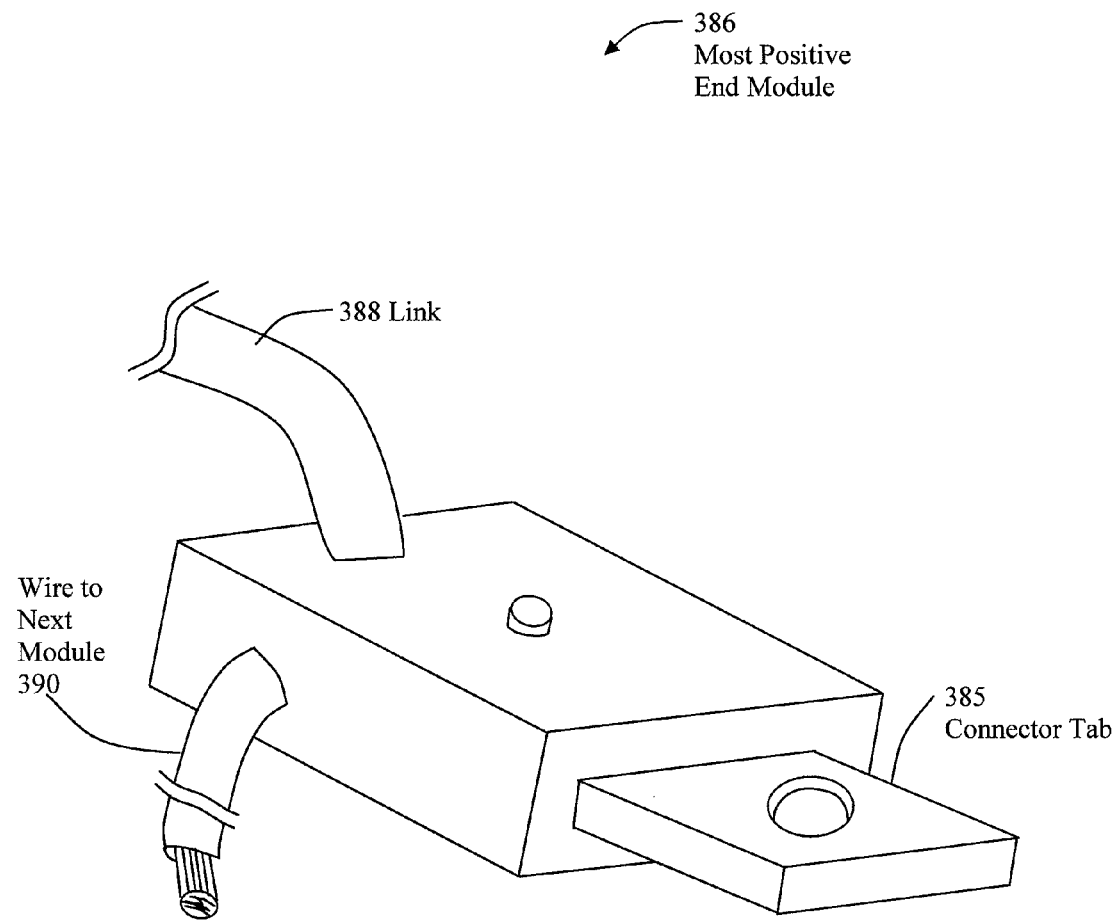
FIG. 3G is a schematic illustration of a most negative end module.

FIG. 3G is a schematic illustration of an embodiment of a most negative end module 386. As shown in FIG. 3G, connector tab 385 is connected to the negative terminal of the most negative cell. Wire 390 is connected to the next more positive module in the distributed battery management system. Link 388 is an isolated link that is connected to a main controller, such as main controller 272 in FIG. 2, and carries data from the cell modules to the main controller.

Figure 4:
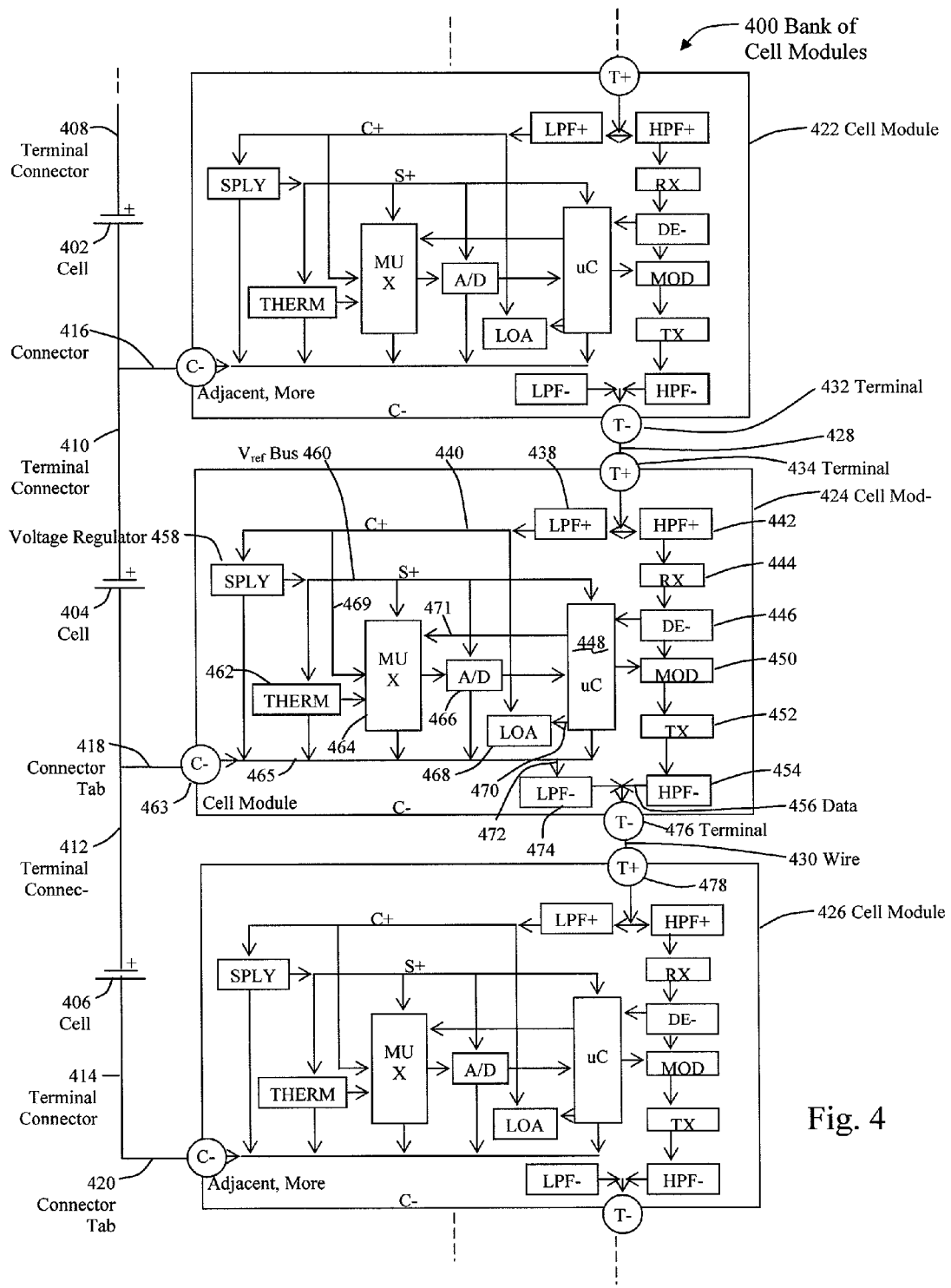
FIG. 4 is a schematic block diagram of an embodiment of electrical components of a cell module and the interconnection of a cell module with other cell modules.
Figure 5:
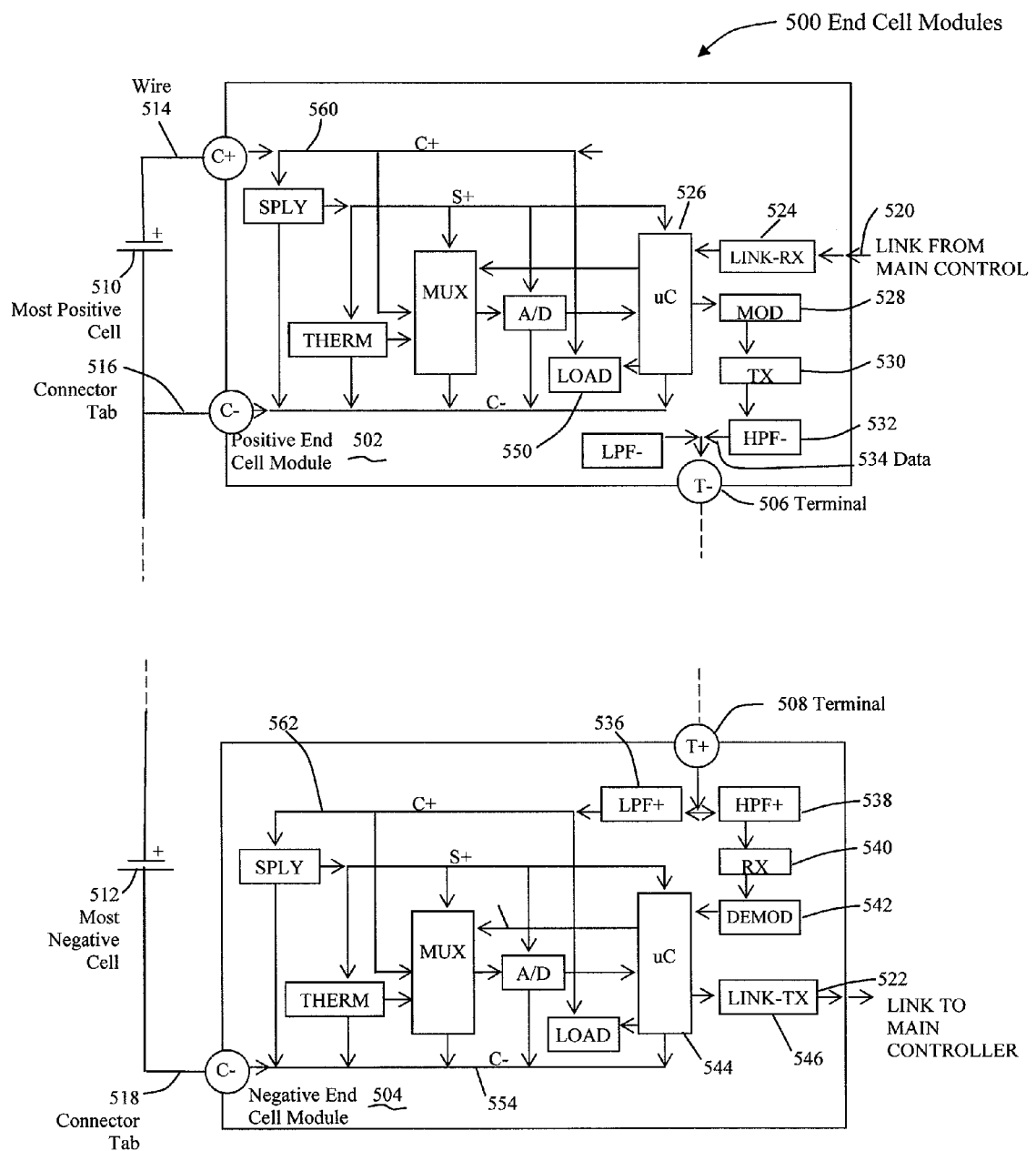
FIG. 5 is schematic block diagram of embodiments of components of end modules.

FIG. 4 is a schematic block diagram of a bank of cell modules 400 that illustrates one embodiment of electronic components that can be included in cell modules. The bank of cell modules 400 includes individual cell modules 422, 424, 426. Each of the cell modules 422, 424, 426 has the same layout. The cell modules 422, 424, 426 do not constitute end cell modules, but rather, cell modules that are connected in series between the end cell modules that are illustrated in FIG. 5. As shown in FIG. 4, the cell modules 422, 424, 426 are connected to cells 402, 404, 406. Connector tab 416 connects cell module 422 to the negative terminal of cell 402. Connector tab 416 is also connected to terminal connector 410, which is, in turn, connected to the positive terminal of cell 404. Similarly, connector tab 418 is connected to the negative terminal of cell 404 and terminal connector 412, which is connected to the positive terminal of cell 406. Further, connector tab 420 is connected to the negative terminal of cell 406 and to terminal connector 414, which is connected to the terminal of the next cell in the series connected bank of cells. In a similar manner, terminal connector 408 is connected to the negative terminal of the next most positive cell in the bank of cells.

Since the three cell modules 422, 424, 426, illustrated in FIG. 4, are the same, only the description and operation of cell module 424 is described below. As shown in FIG. 4, wire 428 connects terminal 432 of cell module 422 to terminal 434 of cell module 424. Through cell module 422, wire 428 provides the voltage level of the positive terminal of cell 404, which is used by cell module 424 to detect the voltage of cell 404, as well as provide power to the cell module 424 for operating cell module 424. In addition, wire 428 provides data from cell module 422, as well as power, a voltage level sample and a discharge current. Low pass filter 438 supplies the DC voltage from the positive terminal of cell 404 to positive voltage bus 440 in cell module 424. High pass filter 442 passes data, which may comprise digital data, placed on wire 428 by cell module 422. High pass filter 442 may also be a band pass filter that is tuned to the high frequency band of the modulation frequency of the modulator in the previous cell module. Low pass filter 438 filters out the noise and other high frequency signals, such as the data signals, and provides a consistent DC signal on positive bus 440 from which measurements of the voltage level of the positive terminal of cell 404 can be made. Hence, wire 428 carries the data relating to the cell 402 and data from previous cells, a voltage source from the positive terminal of cell 404, to power cell module 424, a voltage level of cell 404 that is sampled to determine the voltage of cell 404 when compared to the voltage on negative bus 465 that is the same voltage as the negative terminal of cell 404, and a discharge current that passes through load 468 to adjust the voltage of cell module 424. These four functions are handled by a single wire 428, which reduces the number of connections and wires in the battery management system.

As also illustrated in FIG. 4, the high pass filter 442 is connected to a receiver 444 that detects the stream of digital data. The serial data stream is a stream of data that provides information to the main controller, such as main controller 272, relating to the voltage of each of the cells and the temperature at the negative terminals of the cell. The data from cell module 422 is passed over wire 428 to cell module 424. The data on wire 430 includes the digital data stream of the data generated by cell module 422, as well as the data generated by cell module 424, which is appended to the data stream from cell module 422. Demodulator 446 demodulates the data to generate a binary stream that is applied to microprocessor 448. Microprocessor 448 uses the data to control the multiplexer 464, via control line 471, and the load 468, via control line 470. Voltage regulator 458 is connected to the positive voltage bus 440. Voltage regulator 458 generates a regulated reference voltage on regulated voltage bus 460. The thermal detector 462, multiplexer 464, the A to D converter 466, and the microprocessor 448 are all operated using the regulated voltage on the regulated voltage bus 460. Connector tab 418 is connected to the tab terminal 463, which is, in turn, connected to the negative voltage bus 465, which is a voltage on the negative terminal of cell 404. For example, load 468 may be a transistor switch that is connected to an in-line resistor that allows current to flow from the positive voltage bus 440 to the negative voltage bus 465. This current functions as a small discharge current that decreases the charge of cell 404. For example, the resistance in load 468 may allow on the order of 300 milliamps to flow as a discharge current to reduce the charge of cell 404. Of course, as the voltage increases on any particular cell, the discharge current will increase. However, these small currents do not create large power dissipation problems in the cell modules. The decrease in voltage occurs over a period of time, at a slow rate, until a balancing of the cells in the battery is accomplished. The use of low discharge currents also reduces heat in the cell, which can adversely affect the longevity and self discharge of the cell. Further, if more current flows through wires 428, 430, the size of the wire must be increased, as well as the current handling of low pass filters 438 and 478, so that voltage drops do not occur, which will reduce the accuracy of the measurements of the detected voltages on the cells. More importantly, the level of the discharge current relates more closely to the maximum fault current that the electronic components on the cell module can handle, if the cell module is misconnected, such as if the cell module is connected backwards. Although the protection circuits illustrated in FIG. 10 will eventually trip and provide protection, the electronic components will be subject to high fault currents, that can damage these electrical components. The selection of the level of the balancing current is a result of a careful analysis of the amount of fault current that the components in the cell modules can handle, appropriate values for fuses and fuse reaction times, and the desire to maximize the balancing current. Typically, approximately one watt of power must be dissipated as a result of the discharge current. Dissipation of one watt of power can be easily handled by the cell modules. In addition, use of lower currents allows the reverse connection protection circuitry, such as that shown in FIG. 10, to be utilized to protect the circuitry of the cell modules. The load is activated by the microprocessor 448, via control line 470, until the voltage of cell 404 is such that the battery is balanced. The complete battery management system, of which the main controller, such as main controller 272 (FIG. 2) is a part, is able to determine which cell should have its charge lowered, so that the cell module associated with that cell can activate the load, such as load 468, illustrated in FIG. 4. Such a determination may be done by the master controller, or by the cell module itself. The balancing of the battery results in the battery capacity to be maximized. The voltage level of the positive terminal of cell 404 is supplied by a line 469 to multiplexer 464. Multiplexer 464 provides the voltage level on bus 440, which is the voltage level of the positive terminal of cell 404 to A to D converter 466 via connector 469. A to D converter 466 compares the voltage on bus 440 to the regulated voltage on bus 460 and generates a binary signal that is applied to the microprocessor 448, which is representative of the voltage of cell 404.

As also shown in FIG. 4, thermal detector 462 is connected to the connector tab terminal 463 and detects the temperature on the negative terminal of cell 404. Thermal detector 462 generates an analog signal representative of the temperature on the negative terminal of cell 404, which is applied to multiplexer 464. During a second time period, multiplexer 464 transmits the thermal data to A to D converter 466. A to D converter 466 generates a binary signal that is applied to microprocessor 448 indicating the temperature on the negative terminal of cell 404. Microprocessor 448 then generates a digital signal indicating both the temperature data on the negative terminal of cell 404, as well as the voltage data of cell 404, which is applied to modulator 450. The modulated signal is then sent to transmitter 452, which is connected to a high pass filter 454, that passes the data to terminal 476. Negative voltage bus 465 is coupled to low pass filter 474 via connector 472. Low pass filter 474 provides a DC voltage that is combined with data 456, which is applied to terminal 476. The combined voltage signal and data signal are transmitted on wire 430 to terminal 478 of cell module 426. The voltage signal transmitted to terminal 478 is used to both power the cell module 426, as well as provide a voltage level of the negative terminal of cell 404 to cell module 426. In addition, the data relating to cell 404, as well as other more positive cells, is transmitted through wires 428, 430, including temperature data and data relating to the voltage of each of the cells. Although FIG. 4 discloses one example of the manner in which data can be transmitted, other techniques can also be used, including time domain modulation techniques, which are known to those skilled in the art.

FIG. 5 is a schematic block diagram of end modules 500 that are connected to the ends of the series of modules, such as disclosed in FIG. 4. End modules 500 comprise a positive end cell module 502 and a negative end cell module 504. Positive end cell module 502 may correspond to positive end module 210 of FIG. 2 and positive end cell module 322 of FIG. 3A. Negative end cell module 504 may correspond to negative end cell module 216 of FIG. 2 and negative end cell module 328 of FIG. 3A. As shown in FIG. 5, link 520 provides data from a main controller, such as main controller 272 of FIG. 2, to a link receiver 524 disposed in positive end cell module 502. The data are fed to microprocessor 526. These data are processed by the microprocessor 526 to control the operation of positive end cell module 502. For example, the microprocessor 526 may activate or deactivate the load 550 of positive end cell module 502, depending upon the detected charge of most positive cell 510. The positive end cell module detects both the voltage of the most positive cell 510, as well as the thermal data relating to the most positive cell 510. These data are provided in the same manner as disclosed above with respect to FIG. 4 to the microprocessor 526. Microprocessor 526 generates a serial data stream of binary data that is applied to a modulator 528. The modulated data from modulator 528 is applied to a transmitter 530 and to a high pass filter 532 that transmits the data signal 534 to terminal 506. Wire 514 connects the positive terminal of the most positive cell 510 to the positive end cell module 502. The voltage of the positive end of most positive cell 510 is applied to the positive bus 560. Connector tab 516 of the positive end module 502 is connected to the negative terminal of the most positive cell 510. Again, the circuitry disclosed in positive end cell module 502 operates in the manner described with respect to cell module 424 of FIG. 4. Terminal 506 transmits the data along with the voltage signal to the next most positive cell module, such as cell module 422, disclosed in FIG. 4.

The negative end cell module 504, illustrated in FIG. 5, receives the voltage and data signal from the adjacent cell module, such as cell module 426 of FIG. 4. Negative end cell module 504 detects the voltage on the positive terminal of the most negative cell 512 from the voltage signal that is received at terminal 508. The voltage signal passes through the low pass filter 536, which eliminates higher frequency signals to positive bus 562, so that accurate measurements can be made of the voltage of the most negative cell 512. Connector tab 518 connects the negative end cell module 504 to the negative terminal of the most negative cell 512. The negative voltage signal is applied to the negative bus 554. The electrical components illustrated in negative end cell module 504 operate in the same manner as described above with respect to the components of cell module 424, illustrated in FIG. 4. The data signals pass through the high pass filter or band pass filter 538 and are transmitted to a receiver 540. The output of the receiver is sent to a demodulator 542 that generates a binary signal that is applied to the microprocessor 544. The microprocessor generates an output signal that is applied to a transmitter that is connected to a transmitter link module 546 that links the data via link 522 to a main controller, such as main controller 272 of FIG. 2. Again, the links 520, 522 can comprise any desirable link that creates isolation between the cell modules 502, 504 and the main controller, such as main controller 272. Isolation is desirable, since voltage spikes and high voltage signals can be isolated from the main controller 272. Fiber optic links, or wireless links, may be used to provide the desired isolation, as well as other techniques for isolation, such as wires coupled to opto-isolators.

Figure 6A:
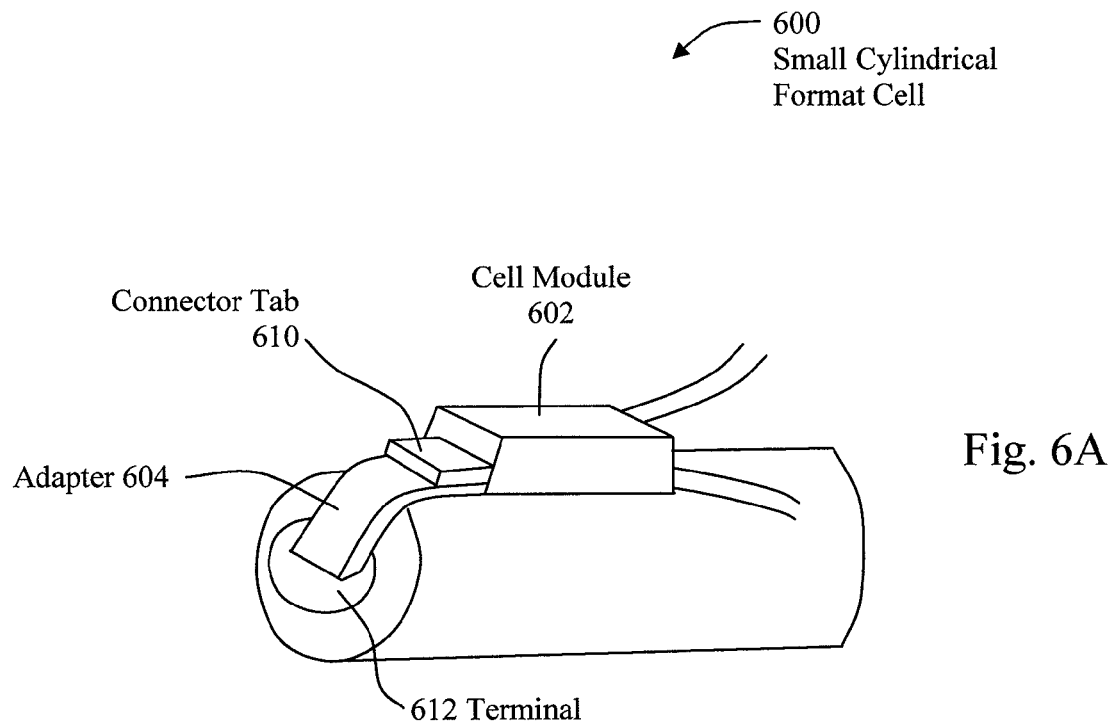
FIGS. 6A and 6B are schematic illustrations of a small cylindrical format cell and an embodiment of an adapter.
Figure 6B:
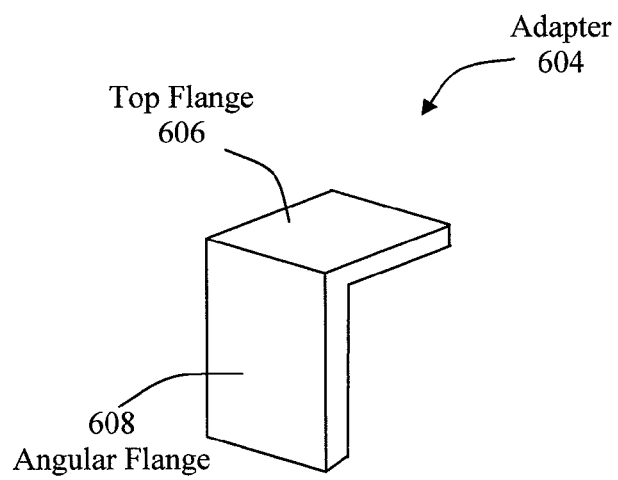

FIG. 6A is a schematic perspective view illustrating an adapter 604 that is used with a small cylindrical format cell 600. As shown in FIG. 6A, connector tab 610 that extends from the cell module 602, is connected to the adapter 604. This connection can be made by soldering, spot welding, or any other permanent or semi-permanent connection. As shown in FIG. 6B, the top flange 606 is connected to the connector tab 610. The angular flange 608 is connected to the terminal 612 on the small cylindrical format cell 600. The connections between the angular flange 608 and the terminal 612 can be made by spot welding or other permanent or semi-permanent techniques that provide a structural support for the cell module 602, as well as a solid electrical connection between the connector tab 610 and adapter 604.

Figure 7A:
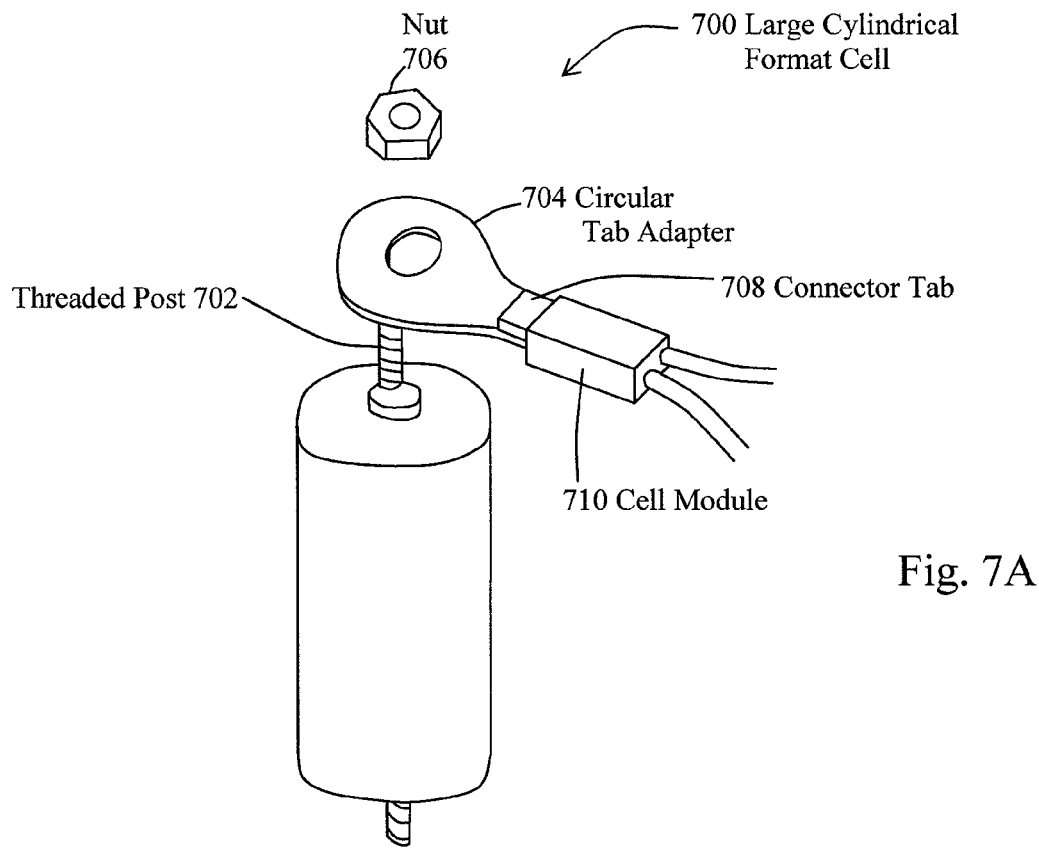
FIGS. 7A and 7B are schematic illustrations of a large cylindrical format cell and an embodiment of a circular tab adapter.
Figure 7B:
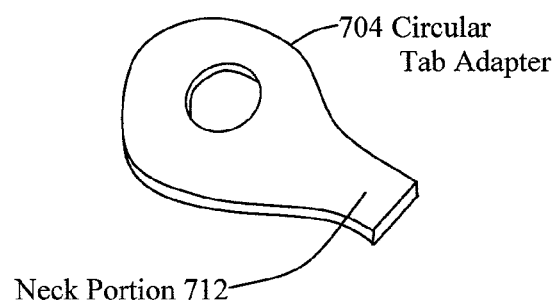

FIGS. 7A and 7B illustrate a large format cell 700. The large cylindrical format cell includes threaded posts, such as threaded post 702. A circular tab adapter 704 has a neck portion 712 to which the connector tab 708 is attached. Again, the attachment can be made by spot welding, soldering, or other permanent or semi-permanent techniques that provide a structural support for the cell module 710 and connector tab 708, as well as a solid electrical and thermally conductive connection between connector tab 708 and circular tab adapter 704. The opening in the circular tab adapter 704 is large enough to accept the threaded post 702. Nut 706 fastens the circular tab adapter 704 to the threaded post 702. Lock washers, thread lock, or other instrumentalities can be used to ensure that nut 706 holds the circular tab adapter 704 tightly to the threaded post 702 to provide both structural support and a strong electrical connection between the threaded post 702 and the circular tab adapter 704.

Figure 8A:
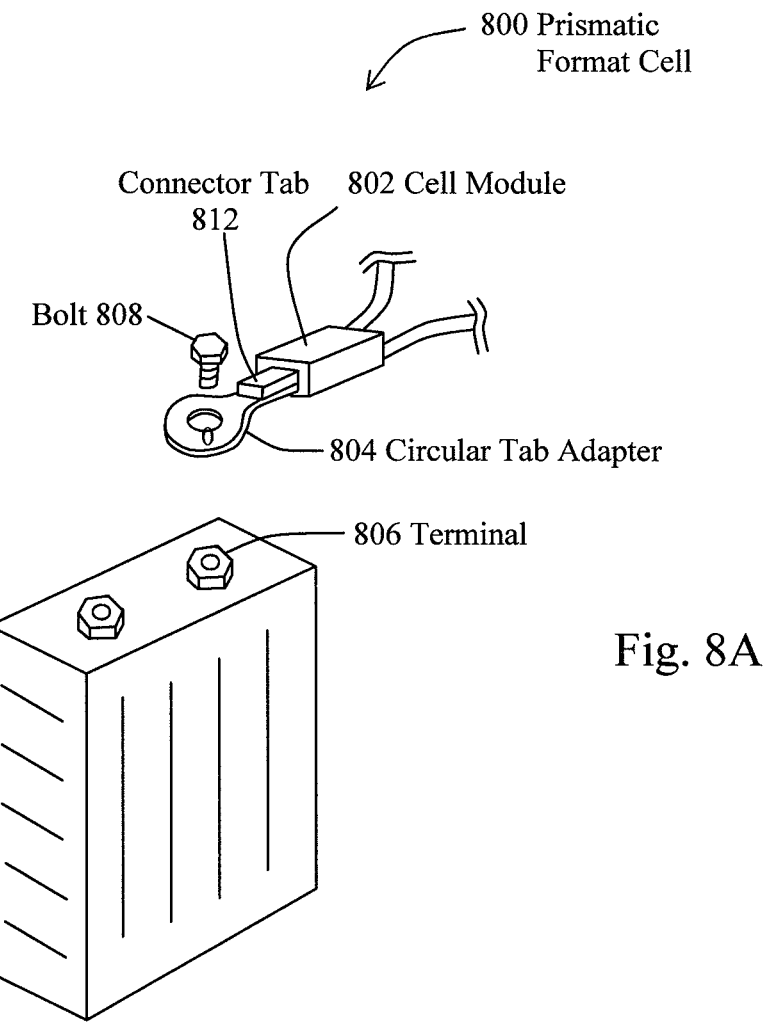
FIG. 8 is a schematic illustration of a prismatic format cell and an embodiment of a circular tab adapter.
Figure 8B:
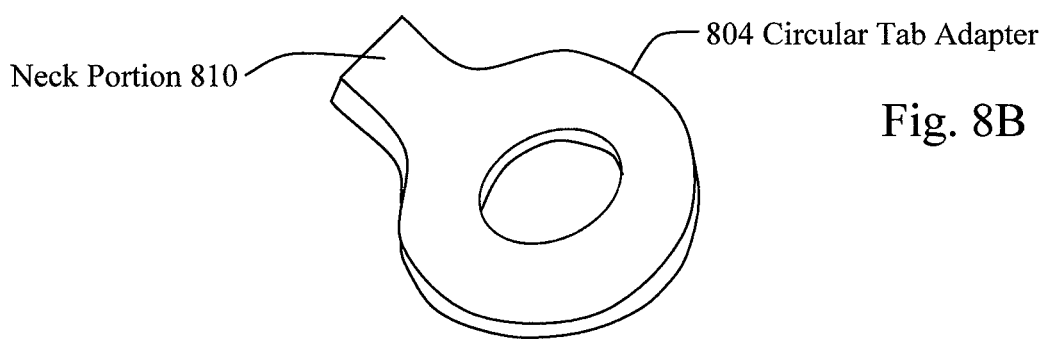

FIGS. 8A and 8B disclose a prismatic format cell 800 that utilizes a circular tab adapter 804. As illustrated in FIGS. 8A and 8B, cell module 802 has a connector tab 812 that is connected to the neck portion 810 of the circular tab adapter 804. Again, the connection should be a solid connection that provides structural support for the cell module 802 and connector tab 812. For example, spot welding or soldering of the connector tab 812 to the neck portion 810 of the circular tab adapter 804 can be used to connect the circular tab adapter 804 to the cell module 802. In addition, spot welding or soldering provides a solid electrical connection between the circular tab adapter 804 and the cell module 802. Of course, other types of connections can be used that provide a solid structural support and a strong electrical connection. Circular tab adapter 804 has an opening so that bolt 808 can fit through the opening in the circular tab adapter 804. Bolt 808 can then be tightened on the threaded opening in the terminal 806. Again, various devices and methods can be used for ensuring that the bolt 808 does not come loose from the terminal 806, such as the use of lock washers, thread locking material, etc.

Figure 9A:
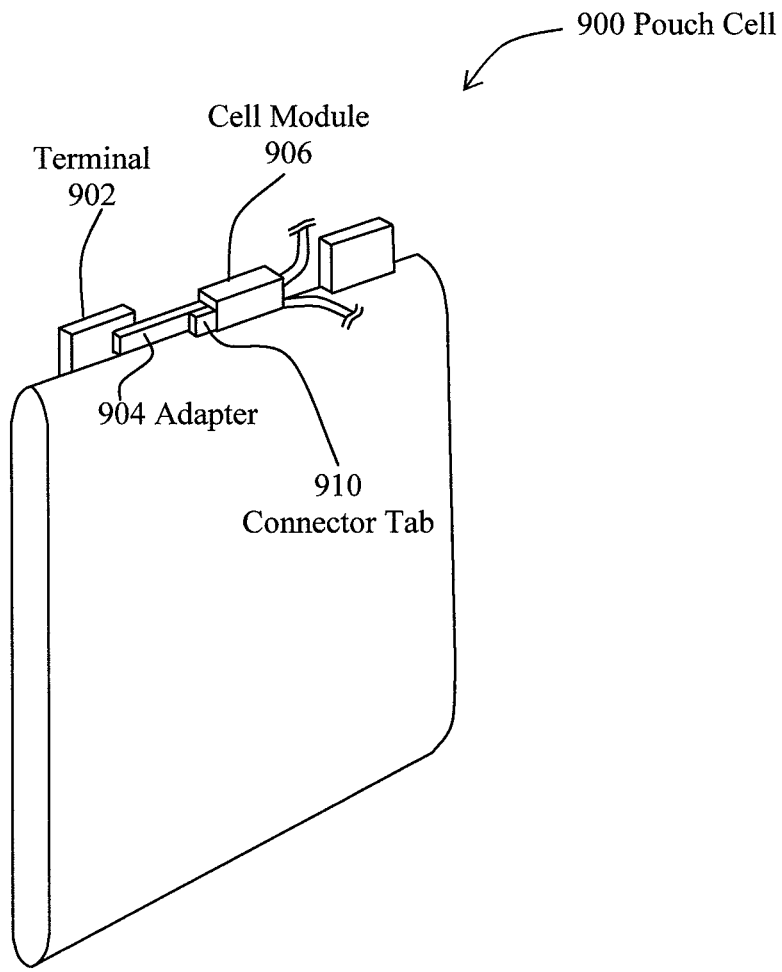
FIGS. 9A and 9B are schematic illustrations of a pouch cell and an embodiment of an adapter.
Figure 9B:
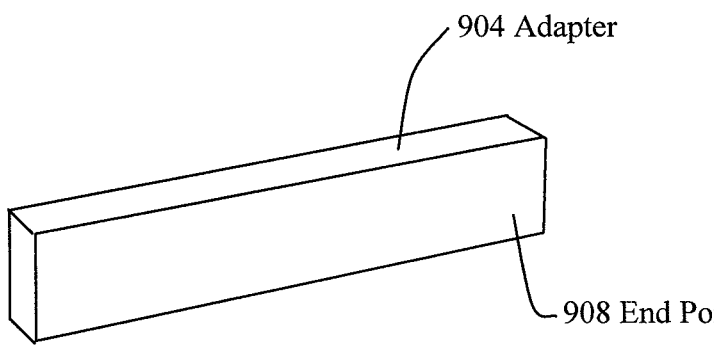

FIGS. 9A and 9B illustrate the use of an adapter 904 with a pouch cell 900. As shown in FIGS. 9A and 9B, adapter 904 has an end portion 908 to which a connector tab 910 is connected. Again, the connector tab 910 of cell module 906 can be spot welded or soldered to the adapter 904 to provide a strong electrical connection between the adapter 904 and the connector tab 910. The adapter is placed against the terminal 902 and is similarly connected to the terminal 902 by spot welding, soldering, or clamping. Another pouch cell can be oriented so that another terminal can be placed against the exposed surface of the adapter 904 to connect a terminal on an additional pouch cell in either parallel or series relationship to pouch cell 900.

Figure 10:
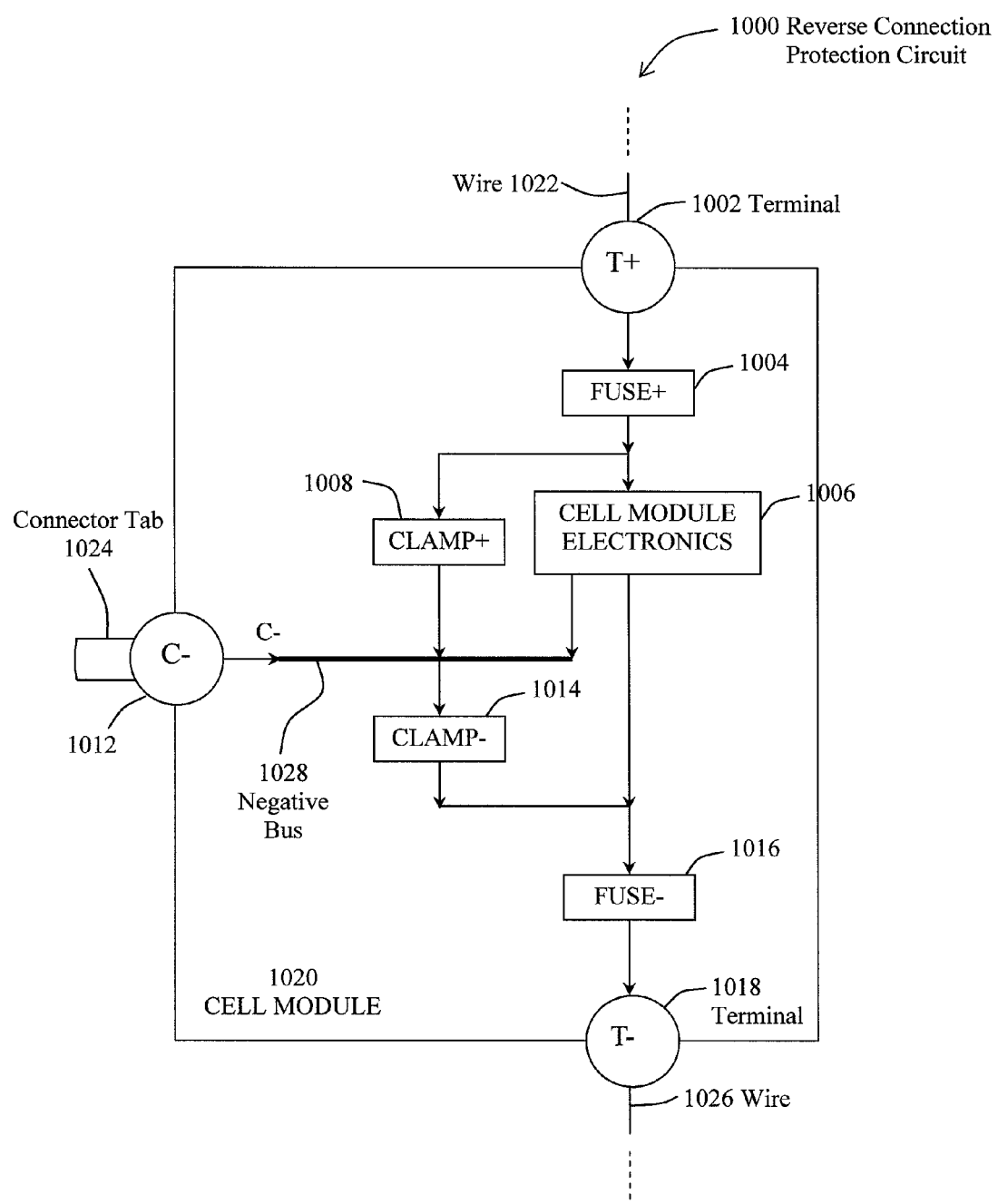
FIG. 10 is a schematic block diagram of a reverse connection protection circuit.

FIG. 10 is a schematic block diagram of a reverse connection protection circuit 1000 that can be used in a cell module 1020. Cell module 1020 is laid out in the manner illustrated in FIGS. 4 and 5. A wire 1022 is connected to terminal 1002 on one end. On the other end, wire 1022 is normally connected to the next most positive adjacent cell module. Terminal 1012 is connected to a connector tab 1024. Connector tab 1024 is normally connected to the negative terminal of a cell. Wire 1026 is connected to terminal 1018. Wire 1026 is normally connected to the next most adjacent negative cell module. If wire 1022 accidentally touches or is connected to a voltage source that can damage cell module 1020, or if a voltage spike is created on wire 1022, for any reason, clamp 1008 clamps the voltage around the cell module electronics 1006 and conducts any additional current to the negative voltage bus 1028 to protect the cell module electronics 1006. Excess current through clamp 1008 causes the fuse 1004 to trip, thereby further protecting the cell module electronics 1006. Fuse 1004 can be a self-resetting fuse. Once the wire 1022 is disconnected from the improper voltage source, or after a voltage spike recedes, the fuse 1004 self-resets, restoring normal operation. If a negative voltage is connected to terminal 1002 or wire 1022, clamp 1008 will prevent the voltage around cell module electronics 1006 from reversing polarity, until the fuse 1004 trips. When the wire 1022, or terminal 1002, is disconnected from the negative voltage source, normal operation is restored. Similarly, if wire 1026 or terminal 1018 are misconnected and excessive or reverse voltage is applied to the terminal 1018, clamp 1014 will clamp the voltage of the negative bus 1028 and fuse 1016 will trip. Normal operation will be restored when the wire 1026 or terminal 1018 is disconnected from the misconnected source. If the connector tab 1024 is misconnected to an excessive voltage source, or a reverse voltage source, with respect to either, or both, terminal 1002, terminal 1018, clamp 1008 and fuse 1004, as well as clamp 1014 and fuse 1016, protects the negative bus 1028.

Figure 11:
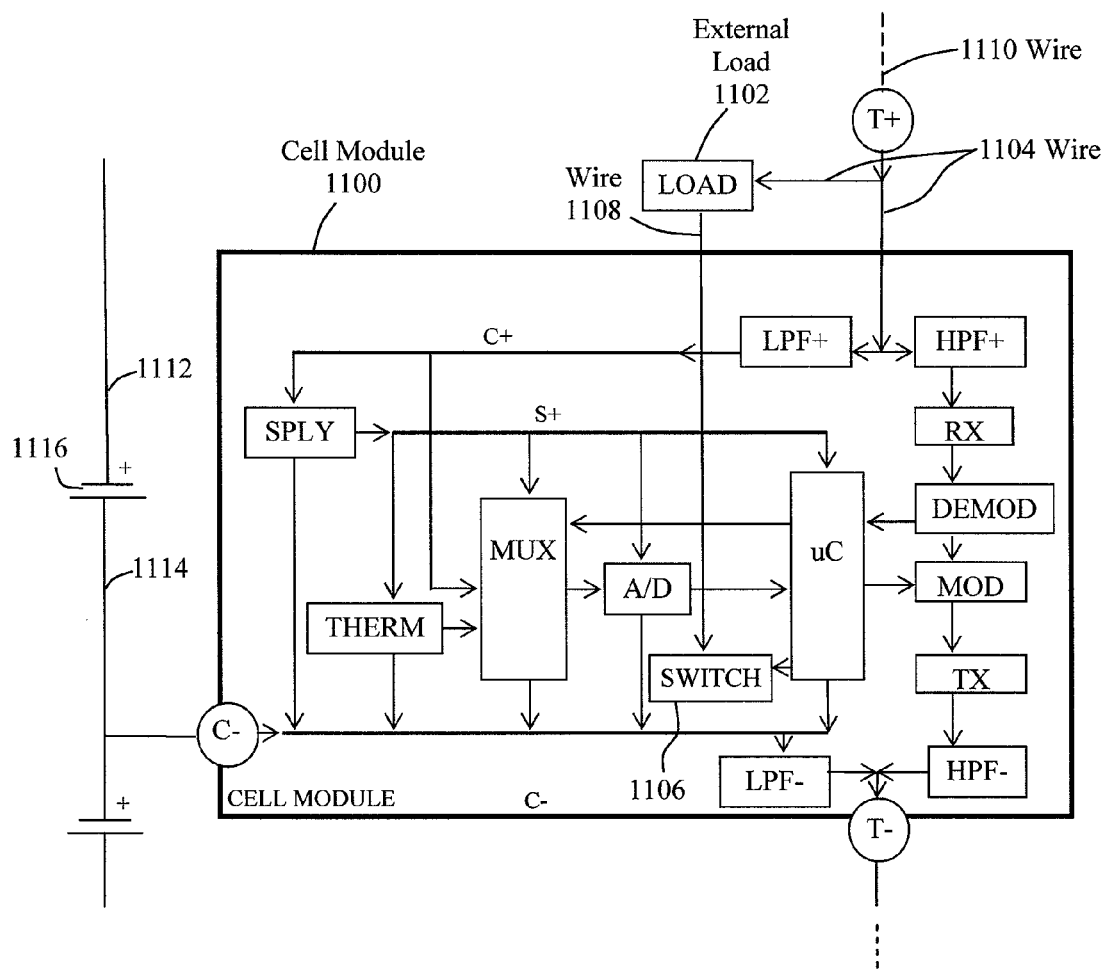
FIG. 11 is a schematic block diagram of a cell module having an external load resistor.

FIG. 11 is a schematic block diagram of a cell module 1100 that has an external load resistor 1102. As illustrated in FIG. 11, cell module 1100 is similar to cell modules 422, 424, 426, illustrated in FIG. 4, except that the external load 1102 is placed outside of the module body. Load 1102 is connected to switch 1106, which is disposed inside the cell module 1100, by wire 1108. Wire 1104 connects the other end of the load 1102 to wire 1110. Wire 1110 is the wire that is used to connect cell module 1100 to a previous cell module.

As disclosed above, load 1102, illustrated in FIG. 11, typically dissipates about one watt of energy in the form of a discharge current between the positive terminal 1112 and negative terminal 1114 of cell 1116. By placing the load 1102 externally to the cell module 1100, greater heat dissipation can be provided. More importantly, the modules have thermal detectors, such as thermal detector 462 of FIG. 4, which measures the temperature on a cell terminal. By including the balancing load, such as balancing load 468 of FIG. 4, inside the cell module, the temperature measurement may be incorrect because of the heat dissipated by the load inside the cell module. Hence, it is advantageous to place the load, such as load 468, outside of the cell module, such as cell module 424, so that the thermal detector, such as thermal detector 462, is not affected by the heat dissipated in the load, such as load 468 of FIG. 4.

Figure 12:
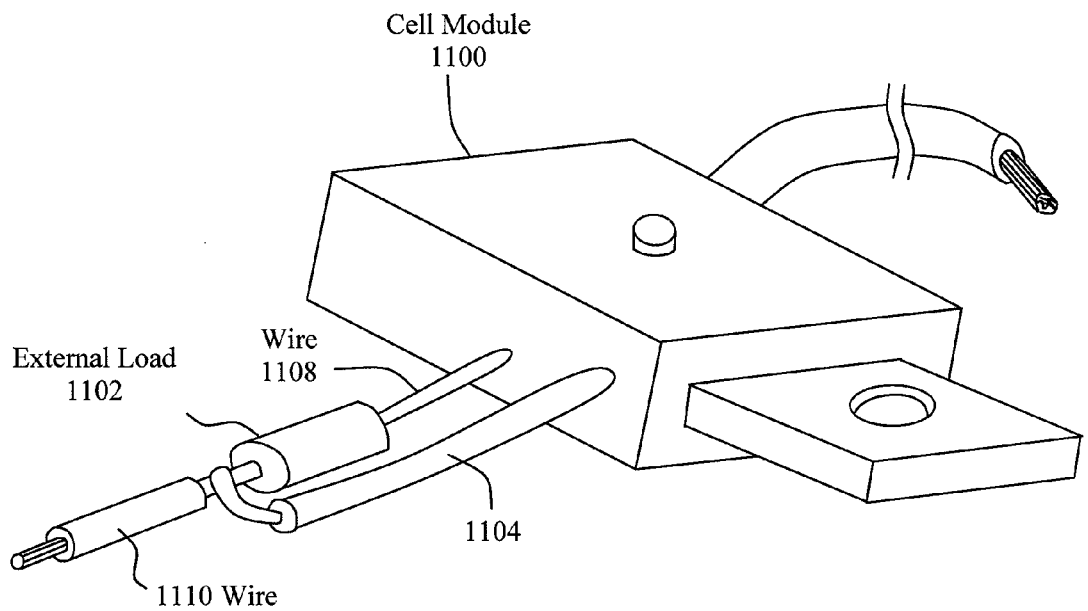
FIG. 12 is a schematic perspective view of a cell module having an external load resistor.

FIG. 12 is a schematic perspective view of cell module 1100. As shown in FIG. 12, wire 1104 connects to a first end of the external load 1102 and extends into the cell module 1100 and connects to the electronic components of cell module 1100. Wire 1108 connects to a second end of external load 1102. Wire 1108 extends into the cell module 1100 and is connected to switch 1106. Switch 1106 may comprise a transistor switch or other desired switching device known to those skilled in the art. Wire 1110, extends to a previous cell module, in the manner disclosed above.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A distributed battery management system having a plurality of cells comprising:
   a cell module comprising:
      a connector tab that is adapted to be connected to a first terminal of a first cell of said plurality of cells so that a solid connection is created between said connector tab and said first terminal that provides electrical and thermal conductivity between said first terminal and said connector tab and structural support for said connector tab, and provides a first voltage signal from said first terminal of said first cell, provides a first voltage level sample of said first voltage signal from said first terminal, and provides a temperature level of said first terminal;
      electrical components connected to said connector tab that detect said temperature level of said first terminal of said first cell and generate a temperature data signal indicative of said temperature level of said first terminal, and that detect a first voltage level on said first terminal from said first voltage level sample;
      a module housing that is structurally supported by said connector tab that surrounds and protects said electrical components;
   a first wire connected to a previous cell module of said distributed battery management system and said electric components that provides a second voltage level signal to said electrical components from a second terminal of said first cell that, together with said first voltage signal, provides power to said electrical components, and that provides a second voltage level sample of a second voltage from said second terminal of said first cell so that said electrical components can generate a voltage level signal indicative of a voltage level of said first cell, said first wire further connected to conduct a discharge current between said first terminal and said second terminal of said first cell, and transmit data representative of a voltage level and temperature of said previous cell;
   a second wire connected to said electrical components that transmits said first voltage signal and said first voltage sample signal from said first terminal of said first cell, and said temperature data signal and said voltage level signal to a subsequent cell module.

2. The distributed battery management system of claim 1 wherein said module housing is constructed from a hard plastic material.

3. The distributed battery management system of claim 1 further comprising:
   an adapter that is connected to said connector tab and said first terminal.

4. The distributed battery management system of claim 3 wherein said adapter connects said connector tab to a terminal of a prismatic cell.

5. The distributed battery management system of claim 3 wherein said adapter connects said connector tab to a terminal of a large cylindrical cell.

6. The distributed battery management system of claim 3 wherein said adapter connects said connector tab to a terminal of a small cylindrical cell.

7. The distributed battery management system of claim 3 wherein said adapter connects said connector tab to a terminal of a pouch cell.

8. The distributed battery management system of claim 1 wherein said electrical components use frequency multiplexing.

9. The distributed battery management system of claim 1 wherein said electrical components use time domain multiplexing.

10. The distributed battery management system of claim 1 further comprising:
    end modules that are connected to a main controller of said distributed battery management system with a link that isolates said end modules from said main controller.

11. The distributed battery management system of claim 1 further comprising:
    insulation displacement terminals disposed on said module housing for connecting said first wire and said second wire to said electrical components;
    covers that provide electrical insulation for said insulation displacement terminals.

12. The distributed battery management system of claim 1 wherein said connector tab is shaped to form a terminal connector.

13. The distributed battery management system of claim 1 further comprising:
    an end module that receives control signals from a main controller over a link and transmits said control data to subsequent modules that are connected in series with said end module.

14. The distributed battery management system of claim 1 further comprising:
    an end module that receives a data stream that indicates temperature and voltage levels of said plurality of cells and transmits said data stream to a main controller over a link that isolates said end module from said main controller.

15. The distributed battery management system of claim 1 wherein said electrical components comprise:
    a reverse connection protection circuit that protects said electrical components whenever said electrical components are connected to said plurality of cells incorrectly.

16. A method of maintaining cells in a battery using a distributed battery management system comprising:
    connecting a connector tab of a first cell module to a first terminal of a first cell so that a solid connection is made between said connector tab and said first terminal that provides electrical and thermal conductivity between said first terminal and said connector tab, as well as structural support for said connector tab;
    connecting electrical components of said first cell module to said connector tab so that said electrical components detect a temperature level of said first terminal and generate a temperature data signal, and obtain a first voltage signal from said first terminal of said first cell;
    connecting said electrical components to a second terminal of said first cell using a first wire that is connected to a previous cell module, that provides a second voltage signal to said electrical components that, together with said first voltage signal, provides power to said electrical components;

comparing said first voltage signal and said second voltage signal in said electrical components to produce a voltage level signal indicative of a voltage level of said first cell;

transmitting said voltage level signal, said temperature data signal and said second voltage signal through a second wire that is connected to said first cell module to a subsequent cell module, together with additional voltage level signals and additional temperature data signals from said previous cell module and any additional previous cell modules;

receiving control signals through said first wire that cause said electrical components to create a discharge current between said second terminal and said first terminal through said first wire and said connector tab to balance said battery, said control signals generated in response to said temperature data signal and said voltage level signal of said first cell.

17. The method of claim 16 further comprising:
covering said first cell module with a module housing that protects said electrical components.

18. The method of claim 17 further comprising:
connecting said module housing to said connector tab so that said module housing is structurally supported by said connector tab.

19. The method of claim 16 further comprising:
using frequency modulation for transmitting said voltage level signal, temperature level signal, said second voltage signal and said discharge current through said second wire.

20. The method of claim 16 further comprising:
using time domain multiplexing for transmitting said voltage level signal, temperature level signal, said second voltage signal, and said discharge current through said second wire.

21. The method of claim 19 wherein said process of connecting said connector tab to said first terminal further comprises:
connecting said connector tab to said first terminal using an adapter that is solidly connected to said connector tab and said first terminal.

22. The method of claim 21 wherein said process of using an adapter comprises:
using an adapter that connects said connector tab to a terminal of a prismatic cell.

23. The method of claim 21 wherein said process of using an adapter comprises:
using an adapter that connects said connector tab to a terminal of a large cylindrical cell.

24. The method of claim 21 wherein said process of using an adapter comprises:
using an adapter that connects said connector tab to a terminal of a small cylindrical cell.

25. The method of claim 21 wherein said process of using an adapter comprises:
using an adapter that connects said connector tab to a terminal of a pouch cell.

26. The method of claim 16 further comprising:
providing end modules that are connected to a main controller of said distributed battery management system with a link that isolates said end modules from said main controller.

27. The method of claim 17 further comprising:
providing insulation displacement connectors on said module housing to connect said first wire and said second wire to said electrical components;
covering said insulation displacement connectors with insulative covers.

28. The method of claim 26 wherein said process of providing end modules comprises:
providing a first end module that receives control signals from said main controller and transmits control data to modules connected in series with said first end module.

29. The method of claim 26 wherein said process of providing end modules comprises:
providing a second end module that receives a data stream that indicates temperature levels and voltage levels of said cells of said battery and transmits said data stream to a main controller over a link that isolates said second end module from said main controller.

* * * * *